(12) United States Patent
Willis et al.

(10) Patent No.: US 9,061,254 B2
(45) Date of Patent: Jun. 23, 2015

(54) BLOCK COPOLYMERS, THEIR MANUFACTURE AND THEIR USE

(71) Applicant: KRATON POLYMERS U.S. LLC, Houston, TX (US)

(72) Inventors: Carl L. Willis, Waller, TX (US); Adrie A. van der Huizen, Castricum (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/333,203

(22) Filed: Jul. 16, 2014

(65) Prior Publication Data

US 2014/0343177 A1   Nov. 20, 2014

Related U.S. Application Data

(63) Continuation-in-part of application No. 14/154,146, filed on Jan. 13, 2014.

(60) Provisional application No. 61/752,256, filed on Jan. 14, 2013.

(51) Int. Cl.
| | |
|---|---|
| *B01D 71/82* | (2006.01) |
| *B01D 61/44* | (2006.01) |
| *B01D 65/10* | (2006.01) |
| *H01M 8/10* | (2006.01) |
| B01D 53/22 | (2006.01) |

(52) U.S. Cl.
CPC ............ *B01D 71/82* (2013.01); *B01D 53/228* (2013.01); *B01D 61/44* (2013.01); *B01D 65/10* (2013.01); *H01M 8/1023* (2013.01); *Y02E 60/521* (2013.01)

(58) Field of Classification Search
CPC ........ B01D 71/82; B01D 61/44; B01D 65/10; B01D 53/22; H01M 8/10; Y02E 60/521
USPC .................................................. 521/27, 32
See application file for complete search history.

(56) References Cited

U.S. PATENT DOCUMENTS

| | | | |
|---|---|---|---|
| 3,450,795 A | 6/1969 | Langer | |
| 3,577,357 A | 5/1971 | Winkler | |
| RE27,145 E | 6/1971 | Jones | |
| 3,595,942 A | 7/1971 | Wald et al. | |
| 3,634,549 A | 1/1972 | Shaw et al. | |
| 3,670,054 A | 6/1972 | De La Mare et al. | |
| 3,700,633 A | 10/1972 | Wald et al. | |
| 3,985,830 A | 10/1976 | Fetters et al. | |
| 4,039,593 A | 8/1977 | Kamienski et al. | |
| 4,107,236 A | 8/1978 | Naylor et al. | |
| 4,391,949 A | 7/1983 | St. Clair | |
| 4,444,953 A | 4/1984 | St. Clair | |
| 5,468,574 A | 11/1995 | Ehrenberg et al. | |
| 5,814,672 A | 9/1998 | Kiyokawa et al. | |
| 5,827,602 A | 10/1998 | Koch et al. | |
| 6,391,981 B1 | 5/2002 | Willis et al. | |
| 6,444,767 B1 | 9/2002 | Schade et al. | |
| 6,455,651 B1 | 9/2002 | Willis et al. | |
| 6,492,469 B2 | 12/2002 | Willis et al. | |
| 6,531,241 B1 | 3/2003 | McEwen | |
| 6,767,976 B2 | 7/2004 | Hamada et al. | |
| 7,169,848 B2 * | 1/2007 | Bening et al. | 525/88 |
| 7,737,224 B2 * | 6/2010 | Willis et al. | 525/333.5 |
| 2006/0217569 A1 | 9/2006 | Schulze et al. | |
| 2009/0166295 A1 | 7/2009 | Chen et al. | |
| 2011/0086982 A1 | 4/2011 | Willis et al. | |
| 2011/0281197 A1 | 11/2011 | Daikoku et al. | |
| 2013/0015071 A1 | 1/2013 | Willis | |
| 2013/0146450 A1 | 6/2013 | Kishino et al. | |

FOREIGN PATENT DOCUMENTS

CA        716645 A  *  8/1965

OTHER PUBLICATIONS

Vinodh et al., J. Biosci. Tech. 1(1), 45-51 (2009).
Coates, G.W., Agnew, Chem. Int., Ed. 41, pp. 2236-2257, 2002.
Dauben et al., J. Am. Chem. Soc. 81(18), 4863-4873 (1959).
Blanc et al., Bull. Soc. Chim. France, 33, 313 et. seq. (1923).
Taiwan Search Report dated Feb. 12, 2015 for corresponding Taiwan Patent Application No. 103101313.

* cited by examiner

*Primary Examiner* — Michael M Bernshteyn
(74) *Attorney, Agent, or Firm* — Novak Druce Connolly Bove + Quigg LLP; Michael A. Masse

(57) ABSTRACT

A functionalized block copolymer polymerized using vinyl-benzylamino derivative monomers for use in such applications as anionic exchange membranes.

18 Claims, 4 Drawing Sheets

BLOCK COPOLYMERS, THEIR MANUFACTURE AND THEIR USE

CROSS-REFERENCE TO RELATED APPLICATION

This application is a continuation-in-part of U.S. application Ser. No. 14/154,146, filed Jan. 13, 2014, which claims the benefit of U.S. provisional Application 61/752,256, filed Jan. 14, 2013, both of which are hereby incorporated by reference in their entirety.

FIELD OF THE INVENTION

The present disclosure relates to block copolymers selectively functionalized in at least one interior block by amino groups, or corresponding onium salt groups, and optionally additional hetero atoms, which exhibit anion exchange properties. In addition, the present disclosure relates to functionalized block copolymers prepared from amine-functionalized monomers.

The functionalized block copolymers exhibit extraordinary properties with regard to dimensional stability, water transport and selective ion transport. Accordingly, products such as membranes which comprise the functionalized block copolymers are particularly suited as anion exchange membranes (AEMs) in applications such as electrically driven water separation processes.

BACKGROUND OF THE INVENTION

Anion exchange resins (bead form) including those suitable as materials for AEMs are known in the art. Generally, such resins are cross-linked and comprise functional groups with basic properties, such as amino groups, covalently linked to the base resin. Typically, anion exchange resins (bead form) and AEMs have been prepared by copolymerizing a divinyl monomer such as divinylbenzene or ethylene glycol dimethacrylate with a monomer already containing ion exchange groups, e.g, 2-sulfoethyl methacrylate, or with a monomer which after polymerization can be converted to contain ion exchange groups, such as styrene and methylstyrene (which can be converted to aminomethyl-substituted styrene) or dimethylaminopropylmethacrylamide (DMAPMA) (which can be converted to a quaternary ammonium halide after treatment with methyl chloride).

It is known also that styrene block copolymers (SBCs) can be functionalized in order to further modify their characteristics. An example of this is the addition of sulfonic acid or sulfonate ester functional groups to the polymer backbone (U.S. Pat. No. 3,577,357, U.S. Pat. No. 5,468,574, U.S. Pat. No. 7,737,224). Additionally, co-pending US Publ. No. 20130015071 to Willis describes modified sulfonated SBCs suitable as materials for AEMs in which the sulfonic acid or sulfonate ester functional groups are converted to sulfonamide functional groups. The sulfonamide functionalized SBCs of Willis et al. are proposed as membrane materials for electrically driven water separation processes in which they are paired with cation exchange membranes such as, e.g., disclosed in U.S. Pat. No. 7,737,224 to Willis et al.

BRIEF DESCRIPTION OF THE DRAWINGS

Implementations of the present technology will now be described, by way of example only, with reference to the attached figures, wherein.

DETAILED DESCRIPTION OF THE INVENTION

Figure 1:
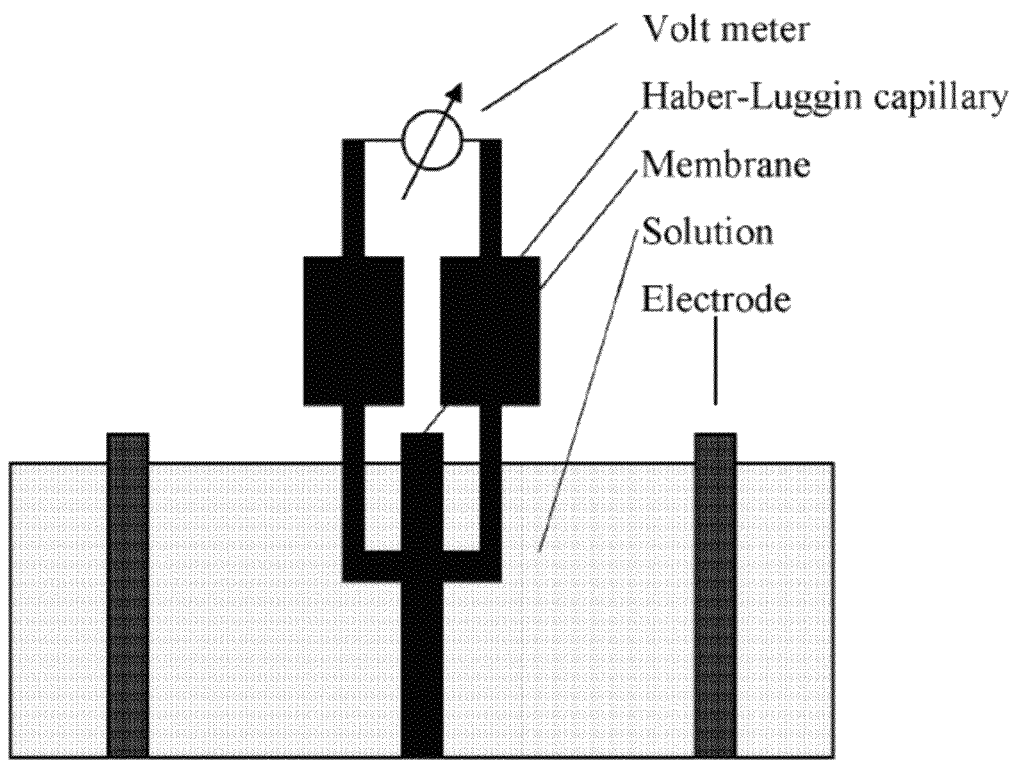
FIG. 1 is a schematic diagram of a set-up for measuring membrane resistance.
Figure 2:
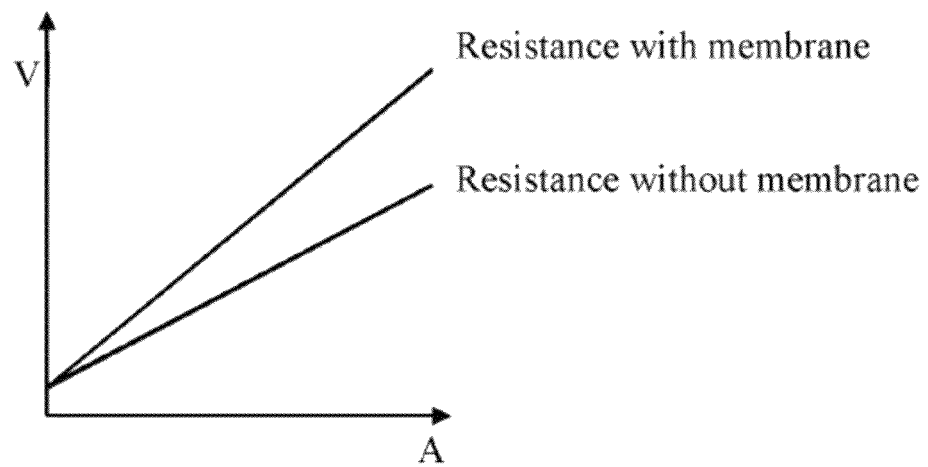
FIG. 2 illustrates how to determine membrane resistance from measurements taken in a set-up according to FIG. 1.
Figure 3:
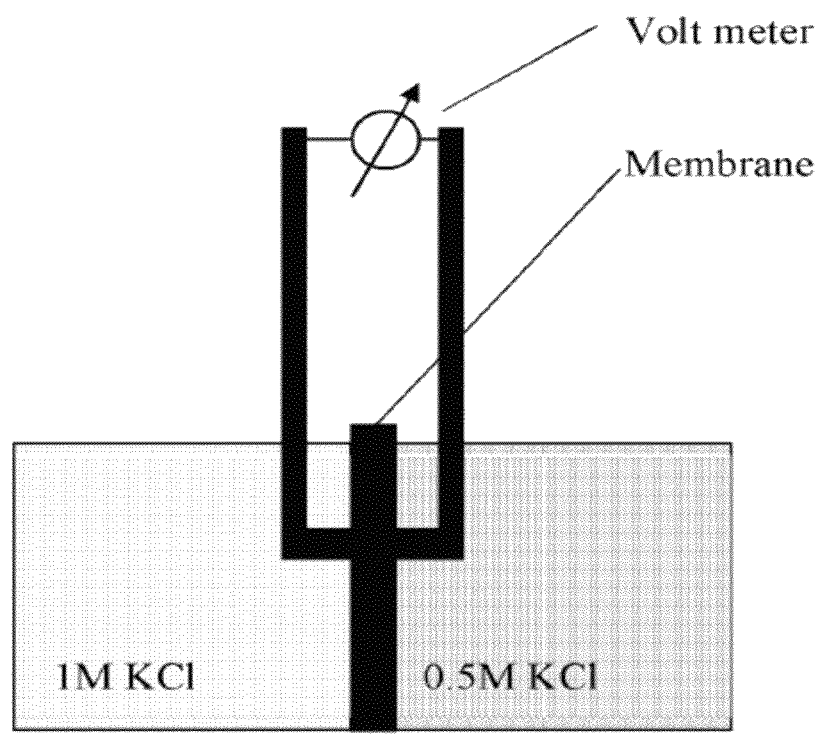
FIG. 3 schematically illustrates the experiment set-up for measuring the permselectivity.

A detailed description of embodiments of the present invention is disclosed herein; however, it is to be understood that the disclosed embodiments are merely exemplary of the invention and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

Referenced Terms

Unless specifically stated otherwise, all technical terms used herein have the meaning as commonly understood by those skilled in the art.

The designation of groups of the Periodic Table of the Elements is used herein in accordance with the current IUPAC convention.

When referring to a block copolymer herein, or to a polymer thereof, it is understood by those having ordinary skill in the art that properties such as the molecular weight or the specific amount(s) of the polymer units which are present are not absolute values but rather may vary from polymer strand to polymer strand, or from one polymer block A to the corresponding to polymer block A, within certain limits. Accordingly, properties such as the amount of a specific polymer unit in the block copolymer, or a particular block thereof, are referred to herein as the "average amount," or for molecular weight of the block copolymer or block, the "number average" is used unless otherwise designated. Additionally, for simplicity of discussion herein, the block copolymer itself may be referred to herein in the singular, but when referring to "average" it would be understood by those of skill in the art that in actual real world conditions, the block copolymer exists in a multitude of strands forming a polymer composition.

Unless specifically indicated otherwise, the expression "substantially free of amino-functional groups" as used herein with regard to polymer blocks A signifies that the respective polymer blocks comprise on average less than 1 polymer unit which carries a substituent comprising the moiety —ZR2, or a corresponding onium salt. In particular, the respective polymer blocks comprise on average no measurable amounts of polymer units which carry a substituent comprising the moiety —ZR2, or a corresponding onium salt.

Unless specifically indicated otherwise, the expression "functionalized" as used herein refers to block copolymers, and segments or blocks thereof, which comprise on average at least one polymer unit of formula (I) or a corresponding onium salt.

Unless specifically indicated otherwise, the expression "essentially non-functionalized" as used herein with regard to the polymer blocks B signifies that the respective polymer blocks comprise on average less than 1 polymer unit which carries a substituent comprising the moiety —ZR2, or a corresponding onium salt. In particular, the respective polymer blocks comprise on average no measurable amounts of polymer units which carry a substituent comprising the moiety —ZR2, or a corresponding onium salt.

Unless specifically indicated otherwise, the expression "onium salt" is used herein as a collective reference to ammonium salts of the functionalized block copolymer, a segment or block thereof, or a polymer unit thereof.

Unless specifically indicated otherwise, the expression "essentially non-halogenated" as used herein signifies that the respective polymer blocks comprise on average less than 1 polymer unit which carries a haloalkyl group. In particular, the respective polymer blocks comprise on average no measurable amounts of polymer units which carry a haloalkyl group.

The expression "polymer unit" as used herein refers to the unit of a polymer chain which is formed by, and corresponds to, one monomer.

Unless specifically indicated otherwise, the expression "halogen" as used herein refers to a halogen different from fluorine, in particular chlorine, bromine or iodine, more specifically chlorine or bromine.

Unless specifically indicated otherwise, the expression "substantially resistant to halogenation" as used herein with regard to the polymer blocks A of the precursor block copolymer means that little, if any, halogenation of the blocks occurs under the conditions employed when the polymer unit(s) of formula (III) of the interior block(s) D° is(are) halogenated to form the polymer unit(s) of formula (II) of the interior block(s) D*.

Unless specifically indicated otherwise, the expression "service temperature" as used herein refers to the range of temperatures at which the material has useful mechanical properties. The upper limit of the service temperature range denotes the temperature above which the mechanical performance of the material is insufficient to meet minimum performance attributes of a particular application. For example, at temperatures above the upper limit of the service temperature range, the material may suffer deformation under applied stress which can be detrimental to the performance. Depending on the nature of the polymer, the upper limit of the service temperature range may correspond to the glass-transition temperature, Tg, (glassy polymer blocks) or the melting temperature, Tm, (crystalline or semi-crystalline polymer blocks).

The expression "high service temperature" as used herein refers to an upper limit of the service temperature range of at least about 20° C.

Unless specifically stated otherwise, the expression "% wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer or a block thereof refers to the number average molecular weight.

The expression "styrene-equivalent molecular weight" as used herein and relating to a block of a block copolymer refers to the molecular weight of the respective block as measured by gel permeation chromatography calibrated with a set of polystyrene standards.

The expression "equilibrium" as used herein in the context of water absorption refers to the state in which the rate of water absorption by a functionalized block copolymer is in balance with the rate of water loss by the functionalized block copolymer. The state of equilibrium can generally be reached by immersing the functionalized block copolymer in water for a 24 hour period (one day). The equilibrium state may be reached also in other wet environments, however, the period of time to reach equilibrium may differ.

The expression "hydrated" block copolymer as used herein refers to a functionalized block copolymer which has absorbed a significant amount of water.

The expression "wet state" as used herein refers to the state at which a functionalized block copolymer has reached equilibrium or has been immersed in water for a period of 24 hours.

The expression "dry state" as used herein refers to the state of a functionalized block copolymer which has absorbed essentially no or only insignificant amounts of water. For example, a functionalized block copolymer which is merely in contact with the atmosphere will generally remain in the dry state.

Unless specifically stated otherwise, the expression "solution" as used herein refers to a liquid, uniformly dispersed mixture at the molecular or ionic level of one or more substances (the solute) in one or more liquid substances (the solvent).

Unless specifically stated otherwise, the expression "dispersion" as used herein refers to a system having a continuous, liquid phase and at least one discontinuous phase. The discontinuous phase may be made up by solid, finely divided particles and/or by liquid droplets, including colloidal particles and micelles. The expression "dispersion" as used herein in particular includes systems in which at least one discontinuous phase is in form of micelles. Also, where the discontinuous phase(s) is(are) exclusively made up by liquid droplets, the expression "dispersion" in particular encompasses "emulsion." A person of ordinary skill will readily appreciate that there are no sharp differences between dispersions, colloidal or micellar solutions and solutions on a molecular level. Thus, a dispersion of micelles may also herein be referred to as a solution of micelles.

The expression "membrane" as used herein refers to a continuous, pliable sheet or layer of a material. For convenience and unless indicated otherwise, the expression "membrane" also may be used herein as a generic reference to membranes and membranous coverings, i.e., films and coatings.

The expression "film" as used herein refers to a membranous covering of a substrate wherein a membrane is reversibly attached to the substrate, i.e., the bonding between the membrane and the substrate allows separating the membrane from the substrate without causing significant harm to the integrity of the membrane.

The expression "coating" as used herein refers to a membranous covering of a substrate wherein a membrane is irreversibly attached to the substrate, i.e., under ordinary conditions the bonding between the membrane and the substrate does not allow separating the membrane from the substrate, or the separation causes significant harm to the integrity of the membrane.

Harm to the integrity of a membrane is considered insignificant so long as it does not prevent the membrane from performing a desired function. Those having ordinary skill will readily appreciate that there is no sharp boundary between the expressions "film" and "coating", and that any such boundary may be dependent upon the use or intended use, and the desired function, of the membranous covering.

The reference to a "corresponding sulfonated block copolymer" as used herein is meant as a reference to a selectively sulfonated block copolymer having similar blocks A and, where present, B in the same configuration as the functionalized block copolymer with which it is compared and which differs in that the interior blocks D of the functionalized block copolymer are replaced by sulfonated styrene blocks having similar molecular weight and ion exchange capacity (IEC) as the block D.

The expression "engineering thermoplastic resin" as used herein encompasses the various polymers such as for example thermoplastic polyester, thermoplastic polyurethane, poly (aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131.

Unless otherwise indicated, the term "molecular weights" refers to the apparent molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. For anionically polymerized linear polymers, the polymer is essentially monodisperse (weight average molecular weight/number average molecular weight ratio approaches unity), and it is both convenient and adequately descriptive to report the "peak" (sometimes referred to as "apparent") molecular weight of the narrow molecular weight distribution observed. Usually, the peak (or apparent) value is between the number and the weight average. The peak (or apparent) molecular weight is the molecular weight of the main species shown on the chromatograph. For polydisperse polymers the weight average molecular weight can be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. Light scattering measurements can be conducted for measurements, including differential refractive index (DRI) detector.

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

Amino-Functionalized Block Copolymers and Monomeric Pathway

Disclosed herein are block copolymers functionalized in at least one interior block by amino groups, or corresponding onium salt groups, and optionally additional hetero atoms, which exhibit anion exchange properties. In particular the block copolymer employed can have an external "hard" A block, an interior "soft" B block, and an amino-functionalized D block. Some exemplary configurations of the block copolymer include A-B-D-B-A or A-D-B-D-A, or (A-B-D)$_n$X or (A-D-B)$_n$X wherein X is the residue of the coupling agent and n is an integer from 2-30.

The block copolymers functionalized in the at least one block disclosed herein can be prepared employing a monomeric pathway, wherein an interior block is formed employing amino functionalized monomers. For example, one exemplary type of monomer can include vinylbenzylamino derivative monomers. The block copolymer can be formed for example via sequential polymerization and/or coupling reactions or other polymerization methods.

The monomeric pathway for formation of the functionalized block copolymer can provide improved control and precision over the formation of the copolymer. For example, greater control over the molecular weight of the functionalized block, as well as the amount of quaternization of the functionalized block can be controlled.

1. Structure of the Functionalized Block Copolymer

The functionalized block copolymers of the present disclosure generally comprise as mandatory constituents at least two end blocks A and at least one interior block D. In particular embodiments, the functionalized block copolymer may further comprise one or more interior block(s) A and/or one or more interior block(s) B.

"Hard" a Block

The end blocks A of the functionalized block copolymer, as well as any interior blocks A, are substantially free of functional groups. Additionally, each of the individual blocks A has a number average molecular weight of from about 1,000 to 60,000 and has a high service temperature.

The nature and the composition of the monomers which make up the individual blocks A is not particular critical so long as the polymerized monomers provide for a polymer phase which meets the service temperature requirement and, thus, can be described as "glassy," "hard," "crystalline," or at least "semi-crystalline." These terms are used interchangeably throughout the specification. It will be understood that many "hard" polymeric blocks may not be fully crystalline and thus have varying degrees of crystallinity, i.e. semi-crystalline. This is distinguishable from amorphous blocks which have no or negligible amounts of crystallinity.

For glassy polymers, the upper limit of the service temperature range is typically limited by the temperature at which the polymer transitions from a glass-like behavior to a liquid-like behavior. This temperature is frequently referred to as glass-transition temperature, $T_g$. The $T_g$ of glassy end blocks A can be determined using differential scanning calorimetry (DSC) or dynamic mechanical analysis (DMA). For crystalline and semi-crystalline blocks A, the upper limit of the service temperature range is usually limited by the melting temperature, $T_m$, of the crystalline portion of the blocks. The melting temperature of crystalline or semicrystalline blocks A can be determined using DSC.

In general, the high service temperature of the end blocks A is at least about 20° C. In some embodiments, the high service temperature of the end blocks A is at least about 50° C. In further embodiments, the high service temperature of the end blocks A is at least about 90° C.

In particular embodiments, each of the blocks A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, conjugated diene monomers which are subsequently hydrogenation (v), and mixtures of monomers selected from (i) to (v).

When the A block is a polymer block of ethylene, it may be useful to polymerize ethylene via a Ziegler-Natta process, as taught in the references in the review article by G. W. Coates et al., Angew. Chem., Int. Ed., 41, 2236-2257 (2002). It is preferred to manufacture such ethylene blocks using anionic polymerization techniques as taught in U.S. Pat. No. 3,450,795. The block molecular weight for such ethylene blocks typically is between about 1,000 and about 60,000.

When the A block is a polymer block of propylene, such polymer blocks may be prepared by a Ziegler-Natta process, as taught in the references in the review article by G. W.

Coates et al., as cited above. The block molecular weight for such polypropylene blocks typically is between about 1,000 and about 60,000.

When the A block is a polymer block of hydrogenated polydienes or conjugated dienes, such as hydrogenated polybutadiene, such polymer blocks may be prepared by methods known in the art and described, e.g., in U.S. Pat. No. 3,670,054 and U.S. Pat. No. 4,107,236. The block molecular weight of such hydrogenated polydiene blocks typically is between about 1,000 and about 60,000. The vinyl content of such A blocks, prior to hydrogenation, generally is at most 20%, more preferably at most 15%, and in particular at most 10%. The lower vinyl content along with hydrogenation results in a "harder" block thereby providing mechanical strength to a block copolymer incorporating the block.

The A blocks also may be polymer blocks of styrene or alpha-alkyl styrene monomers having a phenyl ring which is optionally substituted by one or more alkyl group, such as optionally alkyl substituted styrene and alpha-methyl styrene, hereinafter collectively referred to as (methyl)styrene. The optional alkyl substituent of such (methyl)styrene monomers generally may have from 1 to 10 carbon atoms and may be straight chained or branched. Illustrative examples of such optionally alkyl substituted (methyl)styrene monomers include in particular unsubstituted (methyl)styrene monomers, ortho-alkyl substituted (methyl)styrene monomers, para-alkyl substituted (methyl)styrene monomers, and ortho,para-dialkyl substituted (methyl)styrene monomers. Preferred optionally alkyl substituted (methyl)styrene monomers include unsubstituted (methyl)styrene, ortho-methyl (methyl)styrene, ortho-ethyl (methyl)styrene, ortho-n-propyl (methyl)styrene, ortho-iso-propyl (methyl)styrene, ortho-n-butyl (methyl)styrene, ortho-iso-butyl (methyl)styrene, ortho-sec-butyl (methyl)styrene, ortho-tert-butyl (methyl)styrene, ortho-decyl (methyl)styrene, isomers of ortho-dodecyl (methyl)styrene, para-methyl (methyl)styrene, para-ethyl (methyl)styrene, para-n-propyl (methyl)styrene, para-iso-propyl (methyl)styrene, para-n-butyl (methyl)styrene, para-iso-butyl (methyl)styrene, para-sec-butyl (methyl)styrene, para-tert-butyl (methyl)styrene, para-decyl (methyl)styrene, isomers of para-dodecyl (methyl)styrene, ortho,para-dimethyl (methyl)styrene, ortho,para-diethyl (methyl)styrene, ortho,para-di(n-propyl) (methyl)styrene, ortho,para-di(iso-propyl) (methyl)styrene, ortho,para-di(n-butyl) (methyl)styrene, ortho,para-di(iso-butyl) (methyl)styrene, ortho,para-di(sec-butyl) (methyl)styrene, ortho,para-di(tert-butyl) (methyl)styrene, ortho,para-didecyl (methyl)styrene, isomers of ortho,para-didodecyl (methyl)styrene, and mixtures of the above monomers. Preferred (methyl)styrene monomers are the unsubstituted and the mentioned mono $C_1$-$C_4$-alkyl substituted (methyl)styrene monomers.

In particular embodiments, such A blocks are polymer blocks of styrene monomers in which the phenyl ring is optionally alkyl substituted. Illustrative examples of such optionally alkyl substituted styrene monomers include in particular unsubstituted styrene monomers, ortho-alkyl substituted styrene monomers, para-alkyl substituted styrene monomers, and ortho,para-dialkyl substituted styrene monomers. Preferred optionally alkyl substituted styrene monomers include unsubstituted styrene, ortho-methyl styrene, ortho-ethyl styrene, ortho-n-propyl styrene, ortho-iso-propyl styrene, ortho-n-butyl styrene, ortho-iso-butyl styrene, ortho-sec-butyl styrene, ortho-tert-butyl styrene, ortho-decyl styrene, isomers of ortho-dodecyl styrene, para-methyl styrene, para-ethyl styrene, para-n-propyl styrene, para-iso-propyl styrene, para-n-butyl styrene, para-iso-butyl styrene, para-sec-butyl styrene, para-tert-butyl styrene, para-decyl styrene, isomers of para-dodecyl styrene, ortho,para-dimethyl styrene, ortho,para-diethyl styrene, ortho,para-di(n-propyl) styrene, ortho,para-di(iso-propyl) styrene, ortho,para-di(n-butyl) styrene, ortho,para-di(iso-butyl) styrene, ortho,para-di(sec-butyl) styrene, ortho,para-di(tert-butyl) styrene, ortho,para-didecyl styrene, isomers of ortho,para-didodecyl styrene, and mixtures of the above monomers. Preferred styrene monomers are the unsubstituted and the mentioned mono $C_1$-$C_4$-alkyl substituted styrene monomers.

When the A block is a polymer block of optionally substituted (alkyl)styrene, such polymer blocks also may be prepared by a Ziegler-Natta process, as taught in the references in the review article by G. W. Coates et al., as cited above. The block molecular weight for such (alkyl)styrene blocks typically is between about 1,000 and about 60,000. In the polymerization processes used to make such (alkyl)styrene blocks, only one of the monomers, for example, styrene may be used, or two or more thereof may be used in combination. When two or more of the (alkyl)styrene monomers are used in combination, they may be copolymerized in any copolymerization form, e.g., randomly, in form of blocks and tapered block and the like. The copolymerization form may be affected by selecting conditions such as a combination of the monomers and the timing of adding the monomers to the polymerization system (for example, simultaneous addition of two or more monomers, or separate additions at intervals of a given time).

The A blocks may also be polymer blocks of acrylic esters or methacrylic esters, hereinafter collectively referred to as (meth)acrylic esters. Such polymer blocks may be made according to the methods disclosed in U.S. Pat. No. 6,767,976. Specific examples of suitable (meth)acrylic ester include esters of a primary alcohol and (meth)acrylic acid, such as methyl (meth)acrylate, ethyl (meth)acrylate, propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth)acrylate, methoxyethyl (meth)acrylate; esters of a secondary alcohol and (meth)acrylic acid, such as isopropyl (meth)acrylate, cyclohexyl (meth)acrylate and isobornyl (meth)acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present invention. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth)acrylate, and trimethylolpropane tri(meth)acrylate.

In the polymerization processes used to make the (meth)acrylic ester polymer blocks, only one of the monomers, for example, the (meth)acrylic ester may be used, or two or more thereof may be used in combination. When two or more of the monomers are used in combination, any copolymerization form selected from random, block, tapered block and the like is suitable. The copolymerization forms may be affected by selecting conditions such as a combination of the monomers and the timing of adding the monomers to the polymerization system (for example, simultaneous addition of two or more monomers, or separate additions at intervals of a given time).

In some of the particular embodiments, each of the blocks A is a homo- or copolymer of (methyl)styrene and/or optionally C1-C4-alkyl substituted (methyl)styrene. In further particular embodiments, each of the blocks A is a homo- or copolymer of styrene and/or optionally $C_1$-$C_4$-alkyl substituted styrene.

The individual A blocks of the functionalized block copolymer may be identical or different. When the A blocks of the functionalized block copolymer differ such differences may reside in the number average molecular weight of the individual blocks. Additionally or alternatively, such differences may reside in the nature or in the composition of the monomers which make up the individual A blocks. Preferably, the individual A blocks are similar, although not necessarily identical, in the nature and in the composition of the monomers which make up each of the individual A blocks.

"Soft" B Block

The optional interior blocks B of the functionalized block copolymer also are substantially free of functional groups. Additionally, each of such blocks B may have a number average molecular weight of from about 1,000 to 100,000 and may have a glass transition temperature, Tg, of at most 20° C. In some embodiments, the optional interior blocks B of the functionalized block copolymer has a glass transition temperature, Tg, of at most 10° C. In further embodiments, the optional interior blocks B of the functionalized block copolymer has a glass transition temperature, Tg, of at most 0° C.

The nature and composition of the monomers which make up the individual blocks B is not particularly critical so long as the polymerized monomers provide a phase which meets the glass temperature requirement and, thus, can be described as "amorphous," "soft" or "rubbery." These terms are used interchangeably throughout the specification. It will be understood that "amorphous" blocks contain no or negligible amounts of crystallinity.

In particular embodiments, each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

When the B blocks are polymer blocks of ethylene, it may be useful to polymerize ethylene via a Ziegler-Natta process, as taught in the references in the review article by G. W. Coates et al., as cited above. It is preferred to make the ethylene blocks using anionic polymerization techniques as taught in U.S. Pat. No. 3,450,795. The block molecular weight for such ethylene blocks typically is between about 1,000 and about 100,000.

When the B blocks are polymers of $C_3$-$C_8$ alpha-olefins or isobutylene, such polymer blocks also may be prepared by a Ziegler-Natta process, as taught in the references in the review article by G. W. Coates et al., as cited above. Preferably, the alpha-olefins are propylene, butylene, hexene or octene, with propylene being most preferred. The block molecular weight for such alpha-olefin blocks typically is between about 1,000 and about 100,000.

The B blocks may also be polymer blocks of conjugated dienes which are optionally hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. In the event that the amino-functional group or other functionality is introduced after copolymerization of the various blocks as more specifically addressed herein below it will be necessary to hydrogenate the B blocks when using conjugated diene monomers because non-hydrogenated polymerized conjugated diene blocks are susceptible to halogenation. However, preparation of the functionalized block copolymer along a monomeric pathway as discussed below avoids the need of preventative action, as the D block is formed from amine functionalized monomers rather than a post polymerization reaction. Accordingly, non-halogenated precursor block copolymers which comprise one or more B block(s) made using conjugated diene monomers can be optionally hydrogenated prior to functionalization. When the B blocks are optionally hydrogenated polymer blocks of conjugated acyclic dienes such as butadiene or mixtures thereof, such blocks should have a vinyl content of from 20 and 80 mol percent prior to hydrogenation.

The B blocks may also be polymer blocks of (meth)acrylic esters. Such polymer blocks may be made according to the methods disclosed in U.S. Pat. No. 6,767,976. Specific examples of suitable (meth)acrylic ester include esters of a primary alcohol and (meth)acrylic acid, such as propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth)acrylate, methoxyethyl (meth)acrylate; esters of a secondary alcohol and (meth)acrylic acid, such as isopropyl (meth)acrylate, cyclohexyl (meth)acrylate and isobornyl (meth)acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present invention. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth)acrylate, and trimethylolpropane tri(meth)acrylate.

Additionally, the B blocks may be polymer blocks of silicon rubber segments, i.e., blocks of organopolysiloxanes having recurring units of —[Si(R')2-O]— wherein R' denotes an organic radical, e.g., alkyl, cycloalkyl or aryl.

The B blocks may also contain up to 15 mol percent of the styrene monomers mentioned for the A blocks. In some embodiments, the B blocks may contain up to 10 mol percent, preferably they will contain only up to 5 mol percent, and particularly preferably only up to 2 mol percent of the styrene monomers mentioned in the A blocks. However, in the most preferred embodiments, the B blocks will contain no styrene monomers.

In some of the particular embodiments, each of the blocks B is an optionally hydrogenated homopolymer of butadiene or isoprene.

When multiple blocks B are present in the functionalized block copolymer such blocks may be identical or different. Differences between the individual blocks B may reside in the number average molecular weight or in the nature or the composition of the monomers which make up the individual blocks B. Where multiple blocks B are present, the individual B blocks preferably are similar, although not necessarily identical, in the nature and in the composition of the monomers which make up each of the individual B blocks.

Functionalized D Block

The functionalized block copolymer of the present disclosure has at least one interior block D which has a number average molecular weight of from about 1,000 to about 100,000 and which comprises, on average, at least one amino-functionalized polymer unit of formula (I)

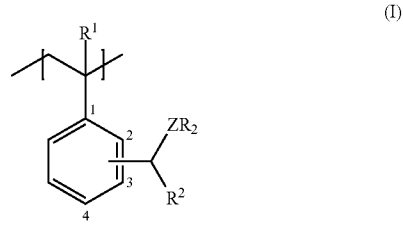

or a corresponding onium salt.

The position in which the moiety —CHR²—ZR₂, or a corresponding onium salt moiety, is bonded to the phenyl ring in formula (I) is generally not critical. Accordingly, the moiety can be linked to the 2-position (ortho), 3-position (meta), or 4-position (para). With a view to ease of access to, and synthesis of, precursor block copolymers or monomers, the moiety preferably is linked to the 2- or 4-position, more preferably the 4-position. In the above formula (I), Z represents nitrogen.

R¹ in formula (I) represents hydrogen or an alkyl group. Alkyl groups in the position of R¹ may have from 1 to 6 carbon atoms and may be straight chained or branched. Illustrative alkyl groups for R¹ include methyl, ethyl, n-propyl, iso-propyl, n-butyl, iso-butyl, sec-butyl, tert-butyl and the like. In particular embodiments, R¹ represents hydrogen or methyl.

R² in formula (I) represents hydrogen or a tertiary alkyl group. Tertiary alkyl groups in the position of R² may have from 4 to 10 carbon atoms and, aside from the branching in the 1-position, may be straight chained or branched. Illustrative tertiary alkyl groups for R² include tert-butyl, 1,1-dimethyl-propyl, 1,1-dimethyl-butyl, 1,1,2-trimethyl-propyl, 1-ethyl, 1-methyl-propyl, and the like. In particular embodiments, R² represents hydrogen, or tert-butyl.

In some of the embodiments, the groups represented by R in the moiety —ZR₂ in formula (I) may be identical or different and each R independently represents hydrogen or an alkyl group which in turn is optionally substituted by a moiety -(A¹-NRᵃ)ₓRᵇ or -(A¹-ORᵃ)ₓRᵇ. Accordingly, one or both R may be hydrogen, or one R may be hydrogen whereas the other R is an optionally substituted alkyl group. Alternatively one or both R groups may be identical or different unsubstituted alkyl groups, or one R is an unsubstituted alkyl group whereas the other R is a substituted alkyl group. In alternative embodiments, both R represent identical or different substituted alkyl groups. In some of the particular embodiments, at least one of the R groups is different from hydrogen. In further particular embodiments, both of the groups R are different from hydrogen.

Unsubstituted alkyl groups in the position of R may have from 1 to 10 carbon atoms and may be straight chained or branched. Illustrative unsubstituted alkyl groups for R include methyl, ethyl, n-propyl, iso-propyl, n-butyl, iso-butyl, sec-butyl, tert-butyl, and the isomers of pentyl, hexyl, heptyl, octyl, nonyl and decyl. In some of the particular embodiments at least one R of the moiety —ZR₂ in formula (I) is an unsubstituted $C_1$-$C_6$-alkyl group. In further particular embodiments each R of the moiety —ZR₂ in formula (I), independently, is an unsubstituted $C_1$-$C_6$-alkyl group.

When R in the moiety —ZR₂ in formula (I) represents and alkyl group which is substituted by a moiety -(A¹-NRᵃ)ₓRᵇ or -(A¹-ORᵃ)ₓRᵇ, such R generally is straight chained, has from 2 to 4 carbon atoms, and optionally carries one or more additional methyl and/or ethyl groups. Illustrative substituted alkyl groups, thus, include moieties such as substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some of the particular embodiments, such optionally substituted alkyl group represented by R is 1,2-ethylene, 1,2-propylene, 1,3-propylene, or 1,4-butylene.

The variable x of the substituent -(A¹-NRᵃ)ₓRᵇ or -(A¹-ORᵃ)ₓRᵇ represents an integer 1, 2 or 3, preferably 1 or 2.

A¹ of the substituent -(A¹-NRᵃ)ₓRᵇ or -(A¹-ORᵃ)ₓRᵇ represents a straight chained alkylene group which is optionally substituted by one or more methyl and/or ethyl groups. The straight chained alkylene groups represented by A¹ generally have from 2 to 4 carbon atoms. Illustrative optionally methyl- and/or ethyl-substituted alkylene groups as represented by A¹, thus, include moieties such as substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some of the particular embodiments, the optionally methyl- and/or ethyl-substituted alkylene group represented by A¹ is 1,2-ethylene, 1,2-propylene, 1,3-propylene, or 1,4-butylene.

The groups represented by Rᵃ and Rᵇ of the substituent -(A¹-NRᵃ)ₓRᵇ or -(A¹-ORᵃ)ₓRᵇ may be identical or different and each of Rᵃ and Rᵇ, independently, represents hydrogen or an alkyl group. That is, if x has a value of 2 or 3, the groups represented by Rᵃ may be identical or different and each Rᵃ, independently, represents hydrogen or an alkyl group. Alkyl groups in the position of Rᵃ and Rᵇ may have from 1 to 6 carbon atoms and may be straight chained or branched. Illustrative alkyl groups for Rᵃ and Rᵇ include methyl, ethyl, n-propyl, iso-propyl, n-butyl, iso-butyl, sec-butyl, tert-butyl and the like. In some of the particular embodiments, Rᵃ and Rᵇ represent hydrogen or $C_1$-$C_6$-alkyl. In further particular embodiments, each of Rᵃ and Rᵇ, independently, represents $C_1$-$C_6$-alkyl.

In further embodiments the two R of the moiety —ZR₂ in formula (I), together with the Z to which they are bonded, form an optionally substituted ring which is made up of Z, carbon ring members, and optionally one or more additional hetero atom ring members selected from the groups of nitrogen and oxygen. The rings formed by Z and two R may have from 3 to 14 ring members, may be mono- or poly-cyclic, and may be saturated, partly unsaturated or aromatic. Optionally, such rings are substituted by one or more alkyl groups as hereinbefore mentioned in general and in particular for Rᵃ. Illustrative examples of the rings formed by Z and two R include moieties such as pyrrolidine, piperidine, piperazine, 1-azabicyclo[2,2,2]nonane, 1,4-diazabicyclo[2,2,2]octane (DABCO), morpholine, pyrrole, pyrazole, imidazole, pyridine, pyridazine, pyrimidine, pyrazine, indole, isoindole, indazole, purine, carbazole, phenoxazine, azepine, and the like.

Those having ordinary skill will appreciate that the nitrogen in systems such as, e.g., DABCO and the like as mentioned in the foregoing, carries three substituents. More specifically, when —ZR₂ represents DABCO, the phenyl ring in formula (I) carries a group

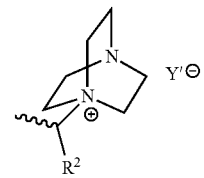

wherein ⌇ denotes the linkage to the phenyl ring and Y'⁻ represents an anion equivalent. The respective polymer units of this type fall within the realm of the mentioned corresponding onium salts.

In particular examples, the D block has a polymer unit made up of polymerized para-vinylbenzylamino (p-vinylbenzylamino) derivatives. Such block can be formed via a monomeric route using p-vinylbenzylamino derivative monomers via sequential polymerization and/or coupling or other polymerization reactions. Therefore, referring to amino-functionalized polymer unit of formula (I), R² is hydrogen, and the amino moiety is linked to the 4-position. Accordingly, amino-functionalized polymer unit can have the p-benzylic structure of the following formula (IV):

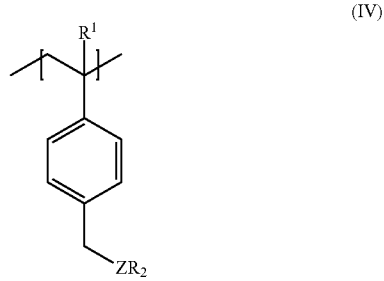

(IV)

Wherein —$ZR_2$ is defined as described above.

Additionally, particular examples of amino group of the p-vinylbenzylamino (p-VBA) derivative includes at least the following:

| Amino moiety | Vinylbenzylamino derivative formed |
|---|---|
| (piperidine) | p-vinylbenzylpiperidine (p-VBP) |
| (morpholine) | p-vinylbenzylmorpholine (p-VBM) |
| (dimethylamine) | p-vinylbenzyldimethylamine (p-VBDMA) |
| (pyrrolidine) | p-vinylbenzylpyrrolidine (p-VBPyr) |
| (bis(2-methoxyethyl)amine) | p-vinylbenzyl-bis-(2-methoxyethyl)amine (p-VBDEM) |
| (methylpiperazine) | p-vinylbenzylpiperazine (p-VBMPip) |

It is found herein that employment of p-vinylbenzylamino derivatives in the D block can have the beneficial effect of suppressing Hoffman elimination reactions. For example, with a typical Hoffman elimination, if an amine linked is directly to a styrene or a cyclic group, with quaternization of the amino moiety (as further described below), this can result in severing of the amino group to form a tertiary amine. Consequently, in an AEM application a polymer susceptible to the Hoffman elimination reaction can degrade. However, with employment of the p-vinylbenzylamino derivatives as disclosed herein, the amino group is attached via a methyl group which acts to hinder the Hoffman elimination. Accordingly, the benzylic structure is more resistant to the Hoffman elimination reaction. This resistance therefore provides greater stability when the functionalized block copolymer is employed in AEM applications.

In some examples, the D block, in addition to the functionalized monomer can include (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homo- and copolymers of alpha-alkyl styrene having a phenyl ring which is substituted by a primary alkyl group.

In some examples, segments of the D block in addition to polymer units of formula (I) or the corresponding onium salt can have segments of polymer units which may be in block A as defined again, for example polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, and (v) mixtures of monomers selected from (i) to (iv). Accordingly, the polymer units of formula (I) or the corresponding onium salt can be random, tapered, or distributed in controlled fashion other polymer segments.

In particular examples, aside from the polymer units of formula (I) or the corresponding onium salt, the D block can include segments derived from (alkyl)styrene or (alkyl)styrene wherein the phenyl ring is substituted by a primary alkyl group, i.e., —$CH_2$—$R^2$. Accordingly, each D block can include units selected from the group of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homo- and copolymers of alpha-alkyl styrene having a phenyl ring which is substituted by a primary alkyl group.

In some examples, the co-monomers which may be copolymerized with the aforementioned (alkyl)styrene units of the block(s) D are not particularly restricted. Essentially all of the monomers mentioned in the context of the blocks A and B are suitable. When two or more of the monomers are used in combination, any copolymerization form selected from random, block, tapered block, controlled distribution block, and the like copolymerization forms may be utilized. For example, the D blocks may include segments of conjugated diene blocks having a controlled distribution of the co-monomers, and partially, selectively, or fully hydrogenated counterparts thereof, such as disclosed in U.S. Pat. No. 7,169,848.

Accordingly, in some examples, the D block can be a mixed block of polymer units of formula (I) or the corresponding onium salt along with polymer units of styrene and or alpha-alkyl styrene (or other polymer unit). Accordingly, as will be further described below, this permits a further control of the degree of functionalized polymer units within the D block. Thus, within the D block there would be styrene momoners which are not functionalized, and those which are functionalized with the amino groups as described above.

Quaternization of the D block

Accordingly, in some of the embodiments, the amino group can be quaternized to form a corresponding onium salt of the functionalized polymer unit, more generally, can be represented by formula ($I^i$)

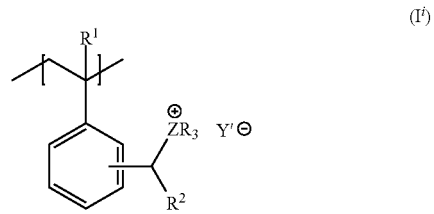

($I^i$)

wherein $R^1$, $R^2$, R and $Y^{i-}$ have the aforementioned meaning. In other embodiments, where the group(s) R represent alkyl which is substituted by a moiety -($A^1$-$NR^a$)$_x R^b$, one or more of the nitrogens of the $-(A^1-NR^a)_xR^b$ substituent(s) may by quaternized to form a corresponding onium salt of the functionalized polymer unit. Similarly, when the groups R, together with the Z atom to which they are bonded, form a heterocyclic ring system containing nitrogen ring members in addition to Z, such additional nitrogen ring members may be quaternized. For example, when $-ZR_2$ represents an optionally substituted piperazine ring, the corresponding onium salt may have a structure as represented by either one of formulae ($I^{ii}$) to ($I^{iv}$):

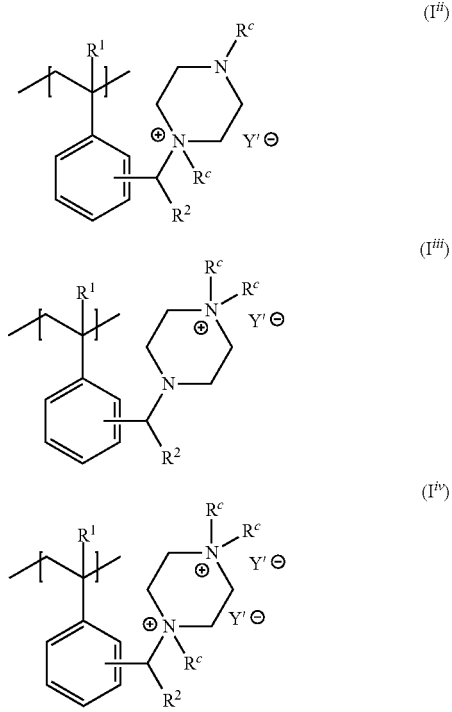

wherein $Y'^-$ has the aforementioned meaning and each $R^c$ independently is hydrogen or alkyl as in general and in particular mentioned for $R^a$. Similarly, when the groups R, together with the Z atom to which they are bonded, form the DABCO ring system, the substituent of the phenyl ring in formula (I) of the corresponding onium salts, also, may have one of the following structures:

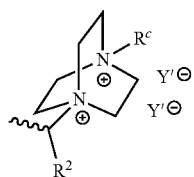

Accordingly, the corresponding onium salts of the functionalized polymer units may be represented generically by formula (I.1)

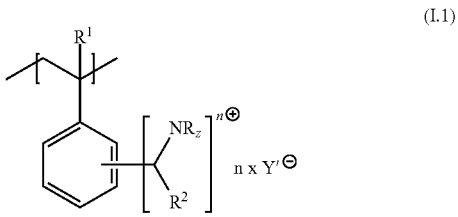

wherein the index z is 2 or 3, n is the total number of quaternized nitrogen atoms which are present in the $-ZR_2$ or $-ZR_3^+$ sub-structure, and $Y'^-$ has the aforementioned meaning.

It is apparent from the foregoing that the number of functional groups which are present in the block D is determined by the average amount of functionalized polymer units, corresponding to formula (I), multiplied by the total number of nitrogen atoms present in the $-ZR_2$ or $-ZR_3^+$ sub-structure. When the functionalized block copolymer is in form of an onium salt it is generally preferred that at least 5%, or at least 10% or at least 15%, and up to 100%, of the functional groups are in form of the onium salt.

The anion which provides the anion equivalent $Y'^-$ of the onium salt is not specifically restricted. In general, the anion may be any mono-basic or poly-basic anion of an inorganic acid or organic acid. Illustrative examples of anions include, for example, halogenides, in particular chloride, bromide and iodide, hydroxyl (OH), sulfate ($SO_4^{2-}$), hydrogensulfate ($H_2O_4^-$), nitrate ($NO_3^-$), phosphate ($PO_4^{3-}$), hydrogen phosphate ($HPO_4^{2-}$), dihydrogen phosphate ($H_2PO_4^-$), carbonate ($CO_3^{2-}$), bicarbonate ($HCO_3^-$), borate ($H_4BO_4^-$), and the like; organic sulfonates such as mesylate ($CH_3-SO_3$), triflate ($CF_3-SO_3$), tosylate ($4-CH_3-C_6H_4-SO_3$), besylate ($C_6H_5-SO_3$), and the like; organic carboxylates such as acetate ($CH_3-CO_2^-$), chloroacetate ($CH_2Cl-CO_2$), dichloroacetate ($CHCl_2-CO_2^-$), trifluoroacetate ($CF_3-CO_2^-$), oxalate (($CO_2)_2^{2-}$), propionate ($C_2H_5-CO_2^-$), malonate (($CH_2CO_2)_2^{2-}$), butyrate ($C_3H_7-CO_2^-$), succinate ($[CH_2(CH_2CO_2)_2]^{2-}$), benzoate ($C_6H_5-CO_2^-$), phthalates ($C_6H_4(CO_2)_2^{2-}$), bis(trimethylsilyl)imide ($[(CH_3)_3Si]_2N^-$), bis(trifluoromethylsulfonyl)imide ([CF3SO2]2N—), and the like.

Exemplary quaternizing agents include alkylating agents, such as for example butyl bromide, benzyl bromide, and neopentyl bromide. Various methylating agents may be suitably employed, such as for example, alkyl halides, methyl iodide, methyl bromide, methyl chloride, and methyltosylate and the like.

It has been found that various amine derivatives vary in reactivity with respect to quaternization. For example, with respect to employing benzylbromide, the amines can have the following order of reactivity:

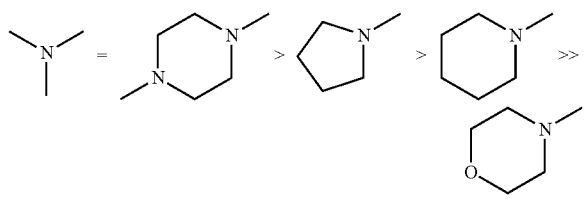

As this is illustrative, the use of other amines or other halides and agents can result in other orders of reactivity.

Polymer Units of the D Block

In general, the functionalized interior block D comprises on average at least one functionalized polymer unit of formula (I) or a corresponding onium salt. However, as the amount of functional groups which are present in the functionalized block copolymer has a direct impact on the anion exchange capacity of the material, it is frequently preferred that at least 5% polymer units of the D block are polymer units of formula (I) or the corresponding onium salt. In some of these preferred embodiments, at least 10%, or at least 15%, or at least 20%, or at least 25%, or at least 30% of the polymer units of the D block are polymer units of formula (I) or the corresponding onium salt.

In some embodiments, 100% of the polymer units of the D block are polymer units of formula (I) or the corresponding onium salt. In other embodiments, on average up to 98%, or up to 95%, or up to 90%, or up to 85%, of the polymer units of the D block are polymer units of formula (I) or the corresponding onium salt.

Accordingly, in some of the embodiments, on average from 10% to 100%, or from 15% to 100%, or from 20% to 100%, or from 25% to 100%, or from 30% to 100%, of the polymer units of the D block are polymer units of formula (I) or the corresponding onium salt. In further embodiments, on average from 10% to 98%, or from 15% to 98%, or from 20% to 98%, or from 25% to 98%, or from 30% to 98%, polymer units of the D block are polymer units of formula (I) or the corresponding onium salt. In some of the embodiments, on average from 10% to 95%, or from 15% to 95%, or from 20% to 95%, or from 25% to 95%, or from 30% to 95%, of the polymer units of the D block are polymer units of formula (I) or the corresponding onium salt. In other embodiments, on average from 10% to 90%, or from 15% to 90%, or from 20% to 90%, or from 25% to 90%, or from 30% to 90%, of the polymer units of the D block are polymer units of formula (I) or the corresponding onium salt. In yet further embodiments, on average from 10% to 85%, or from 15% to 85%, or from 20% to 85%, or from 25% to 85%, or from 30% to 85%, of the polymer units of the D block are polymer units of formula (I) or the corresponding onium salt.

When multiple blocks D are present in the functionalized block copolymer, the individual blocks D may be identical or different. Differences between multiple blocks D may reside in one or more of (i) the number average molecular weight, (ii) the number of functionalized block copolymer units of formula (I) and the corresponding onium salts, (iii) the presence or absence of co-polymerized monomers, and (iv) where present, the amount and the nature of such co-polymerized monomers.

In some examples, when the D blocks are derived from copolymers of the aforementioned (alkyl)styrenes, the (alkyl) styrene polymer units can constitute on average at least about 10% of the co-polymerized polymer block units. More preferably, the (alkyl)styrene polymer units of such co-polymerized block(s) D constitute on average at least about 15%, or at least about 20%, or at least about 25%, or at least about 30%, of the co-polymerized polymer block units. Moreover, the aforementioned (alkyl)styrenes of such co-polymerized block(s) D constitute on average at most about 80%, or at most about 75%, or at most about 70%, of the co-polymerized polymer block units.

Accordingly, in some of the embodiments in which a block D is derived from copolymers of the aforementioned (alkyl) styrenes the (alkyl)styrene polymer units can constitute on average from about 10% to about 80%, or from about 15% to about 80%, or from about 20% to about 80%, or from about 25% to about 80%, or from about 30% to about 80%, of the co-polymerized polymer block units. In further embodiments in which a block D is derived from copolymers of the aforementioned (alkyl)styrenes the (alkyl)styrene polymer units can constitute on average from about 10% to about 75%, or from about 15% to about 75%, or from about 20% to about 75%, or from about 25% to about 75%, or from about 30% to about 75%, of the co-polymerized polymer block units. In other embodiments in which a block D is derived from copolymers of the aforementioned (alkyl)styrenes the (alkyl) styrene polymer units can constitute on average from about 10% to about 70%, or from about 15% to about 70%, or from about 20% to about 70%, or from about 25% to about 70%, or from about 30% to about 70%, of the co-polymerized polymer block units.

Configuration of the Functionalized Block Copolymer

The A, D and optional B blocks of the functionalized block copolymers may be arranged in various configurations so long as the end blocks of such configurations are A blocks, i.e., the D block(s) and optional B block(s) are interior blocks. In some embodiments, the functionalized block copolymers comprise, in addition to the mandatory A and D blocks, at least one further block B. In particular embodiments, the functionalized block copolymers have a general configuration A-D-A, A-D-A-D-A, $(A-D-A)_nX$, $(A-D)_nX$, A-B-D-B-A, A-D-B-D-A, $(A-B-D)_nX$, $(A-D-B)_nX$, or mixtures thereof, wherein n is an integer from 2 to about 30, and X is a coupling agent residue, and wherein the plurality of A blocks, B blocks, or D blocks are the same or different. In further particular embodiments, the functionalized block copolymers have a general configuration A-B-D-B-A, A-D-B-D-A, $(A-B-D)_nX$, $(A-D-B)_nX$, or mixtures thereof, wherein n is an integer from 2 to about 30, and X is a coupling agent residue, and wherein the plurality of A blocks, B blocks, or D blocks are the same or different.

2. Manufacture of the Functionalized Block Copolymer

Monomer Preparation and Polymerization for the D Block

As disclosed herein, the monomeric polymerization of the functionalized block copolymer refers to formation of the block copolymer at least in part by polymerizing monomer according to the one amino-functionalized polymer unit of formula (I) to form the D block.

The functionalized block copolymers can be prepared in various ways as schematically illustrated in the following scheme:

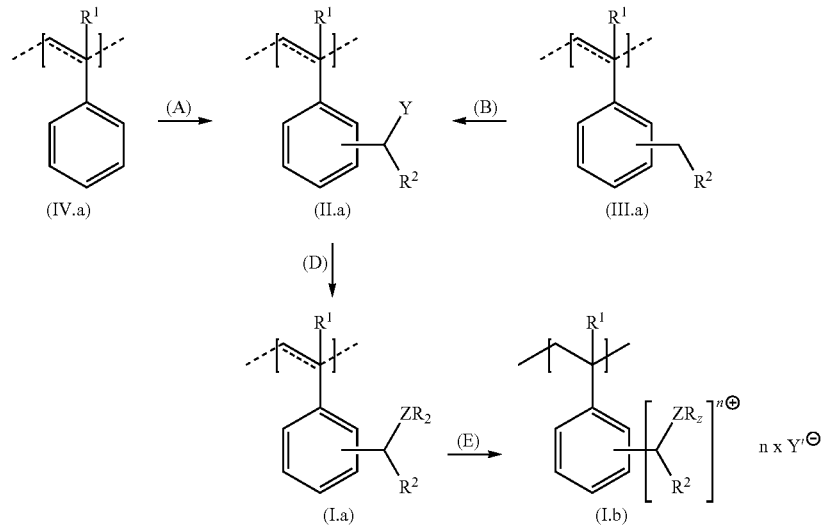

R¹, R², Z, R, Y'⁻, z, and n, in the foregoing formulae (II.a), (III.a), (IV.a), (I.a), and (I.b), have the meaning addressed in general and in particular in the foregoing. Y in formula (II.a) represents halogen, in particular chlorine or bromine. The sub-structure

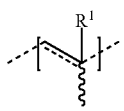

in formulae (II.a), (III.a), (IV.a), and (I.a), is intended to indicate that the starting material and product of the respective conversion may be a monomer or may be a polymer unit of a precursor block copolymer (formulae (III.a) and (IV.a)), of a halogenated block copolymer (formula (II.a)), or of a functionalized block copolymer (formulae (I.a)), respectively.

Preparation of the Functionalized Monomer

In the above, the monomer can be considered formula (I.a) prior to polymerization, which is the same basic formula as the amino-functionalized polymer unit of formula (I) prior to polymerization. Accordingly, paths (A), (B) and (D) can be considered exemplary paths for preparation of the monomer. In some examples, the amino functionalized monomer of formula (I.a) can be obtained commercially, and therefore synthesis paths (A), (B) and (D) are not necessary.

The conversion of units of formula (IV.a) to obtain units of formula (II.a) along path (A) is known in the art as haloalkylation and can be conducted under conditions corresponding to the known procedures. Illustrative descriptions of conditions for haloalkylation are found, e.g., in U.S. Pat. No. 5,814,672, in Blanc et al., Bull. Soc. Chim. France 33, 313 et seq. (1923), and in Vinodh et al., J. Biosci. Tech. 1(1), 45-51 (2009).

In an alternative to the haloalkylation of a unit of formula (IV.a) along path (A), halogenated units of formula (II.a) can also be produced by halogenating a unit of formula (III.a) along path (B) under conditions conventionally employed to halogenate an allylic methylene group. Illustrative descriptions of such halogenation reactions are found, e.g., in US 2006/0217569, and in Dauben et al., J. Am. Chem. Soc. 81(18), 4863-4873 (1959).

In this approach, the unit of formula (II.a) is prepared by reacting the unit of formula (III.a) with a halogenating agent in an inert solvent or diluent in the presence of an initiator. The halogenating agent most commonly employed is N-bromo-succinimide (NBS) although other halogenating agents such as N-chloro-succinimide, N-bromo-tert-butylamine, N-bromo-hydantoins, e.g., N,N-dibromohydantoin, dibromodimethylhydantoin (DBDMH) and the like, may also be used. The reaction involves free radicals and may be initiated using UV light and/or free-radical initiators which are commonly used for that purpose, e.g., tert-butyl hypochlorite, peroxides such as benzoyl peroxide or azo compounds such as azo-bis-isobutyronitrile (AIBN), and the like. Conveniently, a combination of NBS and AIBN can be employed to prepare units of formula (II.a) in which Y denotes bromine.

Any aprotic solvent or diluent may be used with the exception of ethers which may form peroxides and, thus, may give rise to hazardous conditions. Accordingly, aprotic solvents are non-halogenated hydrocarbon solvents, and can include for example pentane, hexane, heptane, cyclohexane, etc. However, in other examples, the solvent used can include halogenated hydrocarbon solvents, including methylene chloride, chloroform, chlorobenzene and/or tetrachloromethane. In some examples, the solvent can be solely aprotic hydrocarbon solvents, or alternatively solely halogenated solvents, or alternatively a mixture of both halogenated and non-halogenated solvents. Therefore, most commonly, the solvent or diluent is or includes an optionally halogenated hydrocarbon, e.g., pentane, hexane, heptane, cyclohexane, methylene chloride, chloroform, chlorobenzene and/or tetrachloromethane, or a mixture of these. In some examples, only aprotic solvents are used, and which can be the same solvent employed in the sulfonation reaction. This reduces cost and time of the process as it permits the functionalization reaction to be conveniently conducted after sulfonation without further solvent treatment steps.

The reaction temperature may vary depending on the type of initiator and halogenating agent, and is normally controlled within the range of room temperature (~25° C.) and about 100° C. When a combination of NBS and AIBN is used, the reaction temperature is usually controlled in the range of from about 50 to about 80° C.

Therefore, after the formation of the halogenated units of formula (II.a) via either path (A) or (B), the monomer according to formula (I.a) can be formed, for example along path (D), illustrated as follows wherein an amine of formula (V.b) is used:

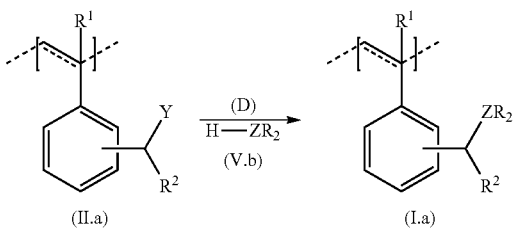

Accordingly, the functionalization may be effected by soaking a pre-formed membrane comprising the halogenated block copolymer represented by formula (II.a) in a solution comprising the amine of formula (V.b), or may be effected prior to membrane casting using a solution or dispersion of the halogenated block copolymer represented by formula (II.a). In formula V.b, Z and R have the aforementioned meaning and can form a heterocyclic group as herein above specified to form monomers for the D block as described herein. If desired, onium salts of the functionalized block copolymer of formula (I.b) with hydro halogenic acid can be converted to the non-salt form in a conventional manner, e.g., by treatment with an inorganic base such as a hydroxide of an alkal-i or alkaline earth metal.

The monomeric approach is illustrated schematically as follows, wherein the monomer is first synthesized and then polymerized to form the D block: The respective approach is schematically illustrated in the following scheme.

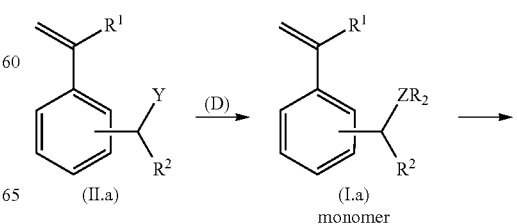

monomer

-continued

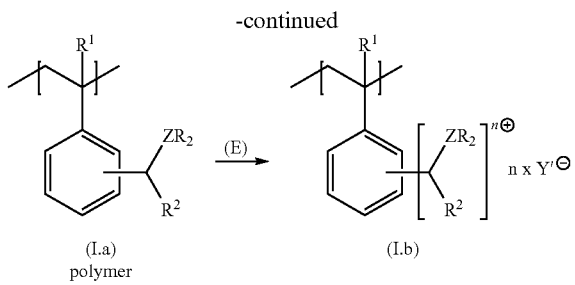

(I.a) polymer → (E) → (I.b)

An exemplary illustration of the preparation of the amine functionalized monomer is shown as follows:

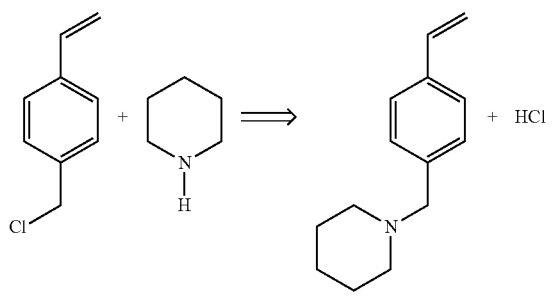

As shown above, p-vinylbenzyl chloride (p-VBC) can be reacted with an amine to form p-VBP with HCl as a byproduct. Although chloride is employed with p-VBC, it will be understood that other halides can be used as well. Further, other amines as described herein can be employed to form the functionalized monomer.

Alternatively, and as previously described, the halogenated monomer as represented by formula (II.a) can be used as starting material. Under those circumstances, the monomer is dissolved or dispersed in a solvent or solvent mixture for treatment with the amine of formula (V.b). Suitable solvents include the aforementioned protic or aprotic polar solvents as well as apolar solvents such as optionally halogenated hydrocarbons.

Block Copolymerization

Homopolymers of the amine functionalized polymer unit typically have brittle mechanical characteristic. However, with combination with the exterior A block and interior B blocks according to the configurations indicated above, a functionalized block copolymer with more beneficial properties can be obtained. The hard and soft phases provided by the A and B blocks respectively, along with the functionalized polymer block, can produce desirable mechanical properties for use in various applications, for example AEM applications.

The polymerization of the functionalized block copolymers as, e.g., using monomers represented by formula (I.a), can be prepared by block copolymerization methods conventionally used for the block copolymerization of styrene block copolymers.

In particular, the monomers corresponding to formula (I.a) can be block copolymerized in a customary fashion. Therefore, the monomers of formula (I.a) are particularly useful in that they allow convenient access to a variety of embodiments of the functionalized block copolymers which pose synthetic challenges when the halogenation is conducted after the block copolymerization. In particular, the monomers of formula (I.a) can be used to form functionalized block copolymers having at least one block A and/or a block B.

Conveniently, the respective block copolymers are block copolymerized via an anionic polymerization process in which the suitable monomers are polymerized in solution in the presence of a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the respective block copolymers include the initial monomers, in particular those used to form the A block, B block or D block. However, in some examples, the initial monomers to begin polymerization can be those used for the A block or D block. Other important starting materials for anionic copolymerizations include one or more polymerization initiators. Suitable initiators include, for example, alkyl lithium compounds such as s-butyllithium, n-butyllithium, tert-butyllithium, amyllithium and the like and other organo lithium compounds including di-initiators such as the di-sec-butyllithium adduct of m-diisopropenyl benzene. Further suitable di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145.

Polymerization conditions to prepare the respective block copolymers are typically similar to those used for anionic polymerizations in general. In the present disclosure polymerization is can be carried out at a temperature of from about –30° C. to about 150° C., more preferably about 10° C. to about 100° C., and most preferably, in view of industrial limitations, from about 30° C. to about 90° C. In some examples, the polymerization of the functionalized monomers and copolymerization with other monomers and blocks can be carried out at room temperature, or alternatively from 15 to 70° C., alternatively from 20 to 60° C., alternatively from 25 to 50° C., or combinations of these aforementioned temperatures, or individual temperatures within such ranges. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the desired molecular weight of the polymer or polymer block. When two or more of the monomers are used in combination, any copolymerization form selected from random, block, tapered block, controlled distribution block, and the like copolymerization forms may be utilized.

The functionalized block copolymers disclosed herein can be prepared by sequential polymerization. Using sequential polymerization alone can typically result in a linear polymer. However, a coupling step can also be employed. For example an initial block copolymer can be formed by sequential polymerization, and then a coupling agent added to form a final coupled block copolymer. The coupled block copolymer can be referred to as linear or radial depending on the number of arms formed. In the above formulas n is an integer of from 2 to about 30, preferably from about 2 to about 15, and more preferably from 2 to 6, and X is the remnant or residue of a coupling agent. A coupled polymer having an n of 2 can be referred to as a linear polymer, and those of 3 or more can be referred to as radial. However, coupling step can also result in a mixture of block copolymers having different n. Accordingly, the value n can also be an average.

A variety of coupling agents is known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949, U.S. Pat. No. 4,444,953, and CA 716,645. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

In particular examples, in polymerizing the functionalized block copolymer, the A block can be made up of a substituted or unsubstituted styrene, such as and the B block can be formed from a conjugated diene such as isoprene and/or butadiene. Additionally, in some examples, the monomer employed for formation of the D block can include p-vinylbenzylamino derivative monomers, such as p-VBP, p-VBM, p-VBDMA, p-VBPyr, p-VBDEM, or p-VBMPip. Additionally, in some particular examples, the block configuration can be A-B-D-B-A, or (A-B-D)$_n$X, where n and X is as defined above. The polymerization reaction can take place in any organic solvent as discussed previously, however, a particular example is cyclohexane. In some examples, the p-vinylbenzylamino (p-VBA) derivative monomers had the tendency to polymerize at a faster rate than styrene.

A particular example of a coupling agent used can include a divinylaromatic compound such as divinyl benzene (DVB). Surprisingly, DVB as coupling agent resulted in a coupling efficiency of at least 65%, at least 70%, at least 75%, at least 80%, or at least 85%. In other examples, the coupling efficiency was from 65%-85%, or alternatively, 70-80%. Coupling efficiency refers to the degree to which the coupling agent is successful in coupling a polymer. For example, if the desired block copolymer is a pentablock copolymer such as (A-B-D)$_n$X when coupled, if left uncoupled, remains a triblock copolymer with a D block that is about half the molecular weight of the coupled block.

DVB can be added at a ratio of DVB to initiator (such as a lithium initiator) of from 0.5:1 to 4:1, alternatively from 1:1 to 3:1, alternatively, 2:1 to 3:1. Surprisingly, employing DVB coupling agent with p-VBA derivative monomers, such as VBP, results in linear coupled block copolymers, having a 2 arms. In other examples, the coupled block copolymer can have 2 to 3 arms, or 3 arms, thus having an n of 2 or 3.

While not being held to any particular theory, it is believed that the surprising coupling properties of a preference for linear or low branching are due to strong (multidentate) coordination of the lithium cation to the tertiary amino groups present.

In some cases, the functionalized block copolymer can be self-coupling. For example, with the employment of p-VBM during polymerization, coupling can occur by the p-VBM in the D block. For example, with polymerization of an A and B block, with additional polymerization of the D block, a pentablock can result with a p-VBM center, thus forming an A-B-D-B-M pentablock. Furthermore, with respect to p-VBM the use of a coupling agent such as DVB, this results in a radial block copolymer (n is greater than 3) rather than a linear or low branching observed.

Accordingly, in some examples use of DVB with p-VBA derivative monomers lacking a cyclic species with oxygen heteroatom can result in linear or lower branched functionalized block copolymers, whereas with p-VBA derivative monomers cyclic species with oxygen heteroatom can form radial branched functionalized block copolymers, or self-couple in the absence of DVB.

Polymerization of p-VBM can occur very fast. While not being held to any particular theory, it is believed that rapid polymerization is likely a result of the proximity effect of the morphilino ether moiety to the propagating anionic center, illustrated in the following:

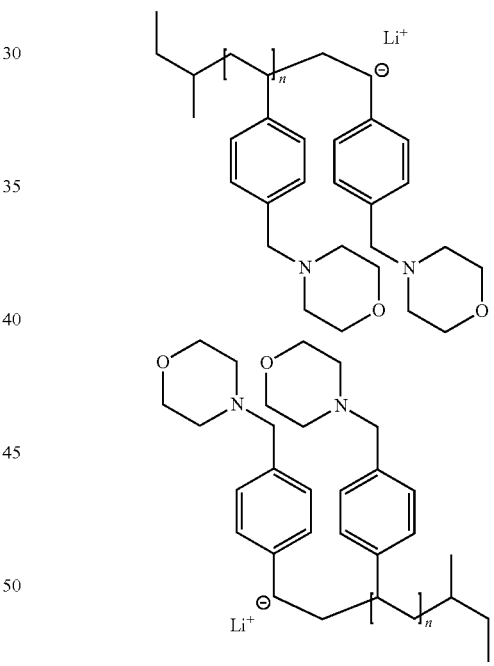

In particular embodiments it has surprisingly been found that functionalized monomers can be block copolymerized under similar or corresponding conditions. In some of these embodiments, the functionalized monomer is a styrene monomer as represented by formula (I.a) in which the moiety —ZR$_2$ denotes a piperidyl or dimethylamino group or the like. The respective monomers can be prepared as described above. Conveniently, p-chloromethylstyrene which is commercially available can be used as starting material to make the functionalized monomers.

In addition to the above, it is recognized that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent, 2) to enhance the thermal stability of the living polymer chain end which permits polymerization at higher temperatures and again, reduces the viscosity of the polymer solution allowing for the use of less solvent, and 3) to slow the rate of reaction which permits polymerization at higher temperatures while using the same technology for removing the heat of reaction as had been used in the standard anionic polymerization process. The processing benefits of using Lewis acids to moderate anionic polymerization techniques have been disclosed in U.S. Pat. No. 6,391,981, U.S. Pat. No. 6,455,651, and U.S. Pat. No. 6,492,469. Related information is disclosed in U.S. Pat. No. 6,444,767 and U.S. Pat. No. 6,686,423. The polymer made by such a moderated, anionic polymerization process can have the same structure as one prepared using the conventional anionic polymerization process and as such, this process can be useful in making the respective block copolymers. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Optional Hydrogenation of Segments Comprising Conjugated Dienes

As noted, in some cases it is necessary to selectively hydrogenate the block copolymer to remove any ethylenic unsaturation from blocks A and/or B. Hydrogenation generally improves thermal stability, ultraviolet light stability, oxidative stability, and, therefore, weatherability of the final polymer.

Hydrogenation can be carried out via any of the several hydrogenation or selective hydrogenation processes generally known in the art. For example, such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and US Re. 27,145. Accordingly, polymers containing ethylenic unsaturation hydrogenated using a suitable catalyst. Such catalyst, or catalyst precursor, preferably comprises a Group 9 or 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. The hydrogenation can be accomplished in a suitable solvent or diluent at a temperature from about 20° C. to about 120° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring with the polymer solution a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid forming an explosive mixture of oxygen and hydrocarbons.

3. Membranes or Films of the Functionalized Block Copolymers

The functionalized block copolymers of the present disclosure are particularly suited as materials for films or membranes, including coatings. Such films or membranes may be obtained by a) providing a composition comprising the functionalized block copolymer in a liquid phase comprising one or more aprotic organic solvents, b) casting the composition, and c) evaporating the liquid phase.

The nature and composition of the liquid phase is generally not critical so long as aprotic organic solvent or solvent mixture is capable to dissolve or disperse the functionalized block copolymer to a degree which is sufficient to achieve a coating or film-casting composition of adequate homogeneity.

Suitable aprotic organic solvents include, e.g., optionally halogenated hydrocarbons having from 4 to 12 carbon atoms. The hydrocarbons may be straight-chained, branched or mono- or polycyclic and may comprise straight-chained, branched as well as mono- or polycyclic, optionally aromatic hydrocarbon groups such as, e.g., straight-chained, branched or cyclic pentane, (mono-, di- or tri-) methylcyclopentane, (mono-, di- or tri-) ethylcyclopentane, straight-chained, branched or cyclic hexane, (mono-, di- or tri-) methylcyclohexane, (mono-, di- or tri-) ethyl cyclohexane, straight-chained, branched or cyclic heptane, straight-chained, branched or (mono- or bi-) cyclic octane, 2-ethyl hexane, isooctane, nonane, decane, paraffinic oils, mixed paraffinic solvents, benzene, toluene and xylenes, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In yet further embodiments, the liquid phase is composed of at least two solvents selected from polar solvents and one non-polar solvents.

Preferably, the polar solvents are selected from water, alcohols having from 1 to 20 carbon atoms, preferably from 1 to 8 carbon atoms, more preferably from 1 to 4 carbon atoms; ethers having from 1 to 20 carbon atoms, preferably from 1 to 8 carbon atoms, more preferably from 1 to 4 carbon atoms, including cyclic ethers; esters of carboxylic acids, esters of sulfuric acid, amides, carboxylic acids, anhydrides, sulfoxides, nitriles, and ketones having from 1 to 20 carbon atoms, preferably from 1 to 8 carbon atoms, more preferably from 1 to 4 carbon atoms, including cyclic ketones. More specifically, the polar solvents are selected from methanol, ethanol, propanol, isopropanol, dimethyl ether, diethyl ether, dipropyl ether, dibutyl ether, substituted and unsubstituted furans, oxetane, dimethyl ketone, diethyl ketone, methyl ethyl ketone, substituted and unsubstituted tetrahydrofuran, methyl acetate, ethyl acetate, propyl acetate, methyl sulfate, dimethyl sulfate, carbon disulfide, formic acid, acetic acid, sulfoacetic acid, acetic anhydride, acetone, cresol, creosol, dimethylsulfoxide (DMSO), cyclohexanone, dimethyl acetamide, dimethyl formamide, acetonitrile, water and dioxane, with water, tetrahydrofuran, methanol, ethanol, acetic acid, sulfoacetic acid, methyl sulfate, dimethylsulfate, and isopropyl alcohol being the more preferred of the polar solvents.

Preferably the non-polar solvents are selected from toluene, benzene, xylene, mesitylene, hexanes, heptanes, octanes, cyclohexane, chloroform, dichloroethane, dichloromethane, carbon tetrachloride, triethylbenzene, methylcyclohexane, isopentane, and cyclopentane, with toluene, cyclohexane, methylcyclohexane, cyclopentane, hexanes, heptanes, isopentane, and dichloroethane being the most preferred non-polar solvents. As noted, the method utilizes two or more solvents.

This means that two, three, four or more solvents selected from polar solvents alone, non-polar solvents alone or a combination of polar solvents and non-polar solvents may be used. The ratio of the solvents to one another can vary widely. For example, in solvent mixtures having two solvents, the ratio can range from 99.99:0.01 to 0.01:99.99.

The concentration of the functionalized block copolymer(s) in the liquid phase depends on the nature of the functionalized block copolymer(s) and on factors such as the identity of the solvent or the solvent mixture. Generally, the polymer concentration falls within a range of from about 1% wt. to about 40% wt., alternatively from about 2% wt. to about 35% wt., alternatively from about 3% wt. to about 30% wt., or a range of from about 1%-wt. to about 30% wt., alternatively from about 2% wt. to about 25% wt., alternatively from about 5% wt. to about 20% wt., based on the total weight of the solution or dispersion of the functionalized block copolymer(s). It will be understood by those skilled in the art that suitable ranges include any combination of the specified weight percentages even if the specific combination and range is not listed herewith.

The dispersion or solution of the functionalized block copolymer(s) in the liquid phase to obtain the composition (a) is achieved, for example, by combining requisite amounts of the functionalized block copolymer(s) and the solvent or solvent mixture at a temperature of from about 20° C. to the boiling point of the employed solvent or solvents. In general, the temperature is in a range of from about 20° C. to about 100° C., alternatively from about 20° C. to about 80° C., alternatively from about 20° C. to about 60° C., alternatively from about 25° C. to about 65° C., alternatively from about 25° C. to about 60° C. (e.g., at about 50° C.). The dispersing or dissolution time to obtain a composition of sufficient homogeneity can be in the range of from approximately less than 1 minute to approximately 24 hours or longer, dependent on the temperature, the solvent or solvent mixture, and the molecular weight and IEC of the polymer.

Those having ordinary skill will appreciate that the quality of the film or membrane may be influenced by the homogeneity of the composition (a). Thus, admixture of the functionalized block copolymer in the liquid phase advantageously may be aided by means of suitable mixing equipment or homogenizers known in the art. In most embodiments, conventional tank or pipe mixing procedures will be suited to obtain a composition of adequate homogeneity. In some embodiments it may be advantageous to homogenize the composition (a) in a conventional homogenizer. Those having skill in the art will appreciate that the thoroughness of mixing may also be facilitated by decreasing the concentration of the functionalized block copolymer. The choice of suitable equipment and concentrations will generally depend on ecologic and economic factors.

The compositions (a) generally may have a solids content up to about 70% wt. although the films and membranes may not necessarily be prepared from compositions having the highest levels of solids. However, compositions (a) in which the solids levels and the concentrations are as high as possible are advantageous for storage or transport to minimize storage volume and shipping costs. Also, storage- and/or transport-grade compositions (a) can desirably be diluted prior to final use to a solids content or viscosity level which is suited for the purposes of a particular application. The thickness of the films or membranes to be prepared and the method of applying the composition to a substrate will usually dictate the solids level of the dispersion and the viscosity of the solution. Generally, when preparing films or membranes from a composition (a), the solids content will be from 1 to about 60% wt., preferably from about 5 to about 50% wt., or from about 10 to about 45% wt.

The thickness of the films and membranes, including coatings, for the applications described herein is not critical and usually will depend upon the target application of the films, membranes and coatings. Normally, the films and membranes may have a thickness of at least about 0.1 µm and at most about 1000 µm. Typically the thickness will range from about 0.5 to about 200 µm, e.g., from about 1 to about 100 µm, or from about 1 to about 35 µm.

Substrates which may be coated with the composition (a) include natural and synthetic, woven and non-woven materials as well as substrates made of one or more of such materials. The shape and form of the substrate may vary broadly, and include fibers, films, textiles, leather and wood parts or constructs. In some embodiments, the substrate is a microporous synthetic material such as polysulfone, polyethylene, polyimide, and the like.

Essentially, any fibrous material can be coated, impregnated or otherwise treated with the compositions (a) by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, spray coating, electro-coating, direct coating, transfer coating, filtration, and a number of different film lamination processes. In a direct coating method, the composition (a) is cast onto the appropriate substrate, usually a textile, and subsequently dried, and optionally cured or crosslinked, e.g. under controlled conditions of temperature and dwell time or throughput. This provides a coated layer comprising the functionalized block copolymer on the substrate. The coated layer is typically non-microporous.

In this method, the coated layer may be provided either directly on the substrate, or the substrate may comprise one or more additional layers, e.g. polymer layers, on its surface. Moisture-vapor permeable tie or base coats and intermediate layers may, for example, be present on the substrate surface. For instance, the substrate may be a textile having a layer of foamed, microporous or hydrophilic polymer. Thus, multilayer coatings having several coated layers (and/or film layers) are provided. In some embodiments, the coating layer comprising the functionalized block copolymer is provided as the outermost layer.

In a transfer coating method, the composition (a) is cast onto a removable release substrate, e.g., release paper and then dried and optionally cured to provide a film or membrane on the release substrate. The film or membrane is typically non-microporous. The release substrate is, for example, a siliconized paper or blanket. The film or membrane may be stored and/or transported in this format prior to further use, or the release substrate may be removed prior to storage or use.

The film or membrane can typically then be bonded to a substrate material using thermal energy, or by using a layer of adhesive. The layer of adhesive may be applied to either the film or membrane, or to the substrate material or to both. The adhesive layer may be either continuous or discontinuous and typically comprises a foamed, microporous or hydrophilic polymer formulation. The release substrate is removed either before or after application of the film or membrane to the material.

In the foregoing manner, directly coated layers as well as multi-layer coatings may be produced. For example, the film which is applied to the material may be a pre-formed multi-layer film, and/or additional layers may be present on the material prior to application of the film of the disclosure. These additional layers may be moisture-vapor permeable tie or base coats and intermediate layers. Thus, multi-layer films, and materials coated with multiple film layers (and/or coated layers), are provided. Typically, the film layer comprising the polymer of the disclosure is provided as the innermost layer.

Combinations of one or more inner layers comprising a coating according to the present disclosure with conventional, less hydrophobic layers may be anisotropic, and may show a directional effect of moisture-vapor flow on the water vapor resistance. This effect is most obvious in bi- and multilayer systems, and the magnitude of the effect is significant in the context of the overall breathability of the materials. Synergy may be observed when the vapor flow occurs first through the film in accordance with the present disclosure, which results in lower than expected water vapor resistance values for the composite. Conversely, vapor flow that occurs first through a less hydrophobic layer may have an undermining effect on the layer comprising a coating according to the present disclosure, which results in higher than expected water vapor resistance values. This additional control feature for moisture-vapor flow may be usefully incorporated into the design of multilayer films, other materials such as coated fabrics and end products such as garments.

4. Properties of the Functionalized Block Copolymers

A feature of membranes comprising the functionalized block copolymer is that such membranes transport anions selectively. In this regard, the membranes disclosed herein complement membranes which comprise sulfonated block copolymers such as, e.g., described in U.S. Pat. No. 7,737,224, which transport cations.

In applications involving both anion- and cation-exchange membranes in combination it is understood that the different membranes are similar in properties such as dimensional stability, strength, flexibility, and the like. The membranes disclosed herein have been found to have the necessary similarity to the cation-selective membranes comprising sulfonated block copolymers such as, e.g., described in U.S. Pat. No. 7,737,224.

The hardness and flexibility of the membrane can be easily adjusted by balancing the styrene content of the A and D blocks with the amount of amount of one or more soft B block(s). As the amount of styrene is increased, the functionalized block copolymer will become harder and less flexible. On the other hand, as the amount of block(s) B is increased, the functionalized block copolymer will become more malleable and flexible.

By adjusting the structure of the functionalized block copolymer, it is possible to produce membranes having surprising wet strength, well controlled and high rates of water and/or anion transport across the membrane, exceptional barrier properties for organic and non-polar liquids and gases, tunable flexibility and elasticity, controlled modulus, and oxidative and thermal stability. It is expected that the membranes would have good resistance to methanol transport and good retention of properties in the presence of methanol.

As these membranes are not cross-linked, they can be reshaped or reprocessed by re-dissolving them in solvent and recasting the resulting solution; they may be reused or reshaped using various polymer melt processes, also.

The functionalized block copolymers according to the present disclosure have a wet tensile strength greater than 100 psi, preferably greater than 500 psi, according to ASTM D412, and a swellability of less than 100% by weight.

The functionalized block copolymers of the present invention typically have wet tensile strengths above 500 psi, and in many cases about 1000 psi. Further, it has been shown that functionalized block copolymers of the present invention have a ratio of wet tensile strength to dry tensile strength greater than 0.3.

5. Applications of the Functionalized Block Copolymers

The functionalized block copolymers may be compounded with other components not adversely affecting the copolymer properties. The functionalized block copolymers may be blended with a large variety of other polymers, including olefin polymers, styrene polymers, hydrophilic polymers and engineering thermoplastic resins, with polymer liquids and other fluids such as ionic liquids, natural oils, fragrances, and with fillers such as nanoclays, carbon, carbon black, carbon nanotubes, fullerenes, and traditional fillers such as talcs, silica and the like.

Additionally, the functionalized block copolymers may be blended with conventional styrene/diene and hydrogenated styrene/diene block copolymers, such as the styrene block copolymers available from Kraton Polymers LLC. Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are blends with the precursor block copolymer, or a non-functionalized, non-halogenated block copolymer corresponding to the functionalized block copolymer.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha-olefin copolymers, and other alpha-olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene, sulfonated styrene block copolymers, and styrene/olefin copolymers. Representative styrene/olefin copolymers are substantially random ethylene/styrene copolymers, preferably containing at least 20, more preferably equal to or greater than 25% wt. copolymerized styrene monomer. Correspondingly, representative sulfonated styrene block copolymers preferably containing at least 20, more preferably equal to or greater than 25% wt. block copolymerized styrene monomer. The degree of sulfonated of sulfonated polystyrene and sulfonated styrene block copolymers may range from one sulfonate group per polymer chain to one sulfonate group per styrene polymer unit.

Hydrophilic polymers include polymeric bases which are characterized as having an available pair of electrons for interaction with acids. Examples of such bases include polymeric amines such as polyethyleneamine, polyvinyl amine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinyl alcohol), poly saccharides, and starches. Other hydrophilic polymers that may be utilized include sulfonated polystyrene.

Hydrophilic liquids such as ionic liquids may be combined with the polymers of the present invention to form swollen conductive films or gels. Ionic liquids such as those described in U.S. Pat. No. 5,827,602 and U.S. Pat. No. 6,531,241 may be introduced into the functionalized block copolymers either by swelling a previously cast membrane, or by adding to the solvent system before casting a membrane, coating a film or forming a fiber.

Illustrative materials that may be used as additional components include, without limitation: (1) pigments, antioxidants, stabilizers, surfactants, waxes, and flow promoters; (2) particulates, fillers and oils; and (3) solvents and other materials added to enhance processability and handling of the composition.

Pigments, antioxidants, stabilizers, surfactants, waxes and flow promoters, when utilized in combination with the functionalized block copolymers may be included in amounts up to and including 10% wt., i.e., from 0 to 10% wt., based on the total weight of the composition. When anyone or more of these components are present, they may be present in an amount from about 0.001 to about 5% wt., and more preferably from about 0.001 to about 1% wt.

Particulates, fillers and oils may be present in an amount up to and including 50% wt., from 0 to 50% wt. based on the total weight of the composition. When anyone or more of these components are present, they may be present in an amount from about 5 to about 50% wt., preferably from about 7 to about 50% wt.

It will be understood by those having ordinary skill in the art that the amount of solvents and other materials added to enhance processability and handling of the composition will in many cases depend upon the particular composition formulated as well as the solvent and/or other material added. Typically such amount will not exceed 50%, based on the total weight of the composition.

The functionalized block copolymers described herein can be employed in a variety of applications and end uses, and their property profile renders them particularly suited as materials in applications which require high modulus when immersed in water, good wet strength, good dimensional stability, good water and ion transport characteristics, good methanol resistance, easy film or membrane formation, good barrier properties, controlled flexibility and elasticity, adjustable hardness, and thermal/oxidative stability.

In one embodiment of the present invention, the functionalized block copolymers may be used in electrochemical applications, such as in fuel cells or redox flow cells (separator phase), anion exchange membranes for fuel cells and redox flow cells, dispersions of metal impregnated carbon particles in polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The functionalized block copolymers are also used as pervaporation or desalination membranes, and in coatings on porous membranes. Their selectivity in transporting gases makes them useful for gas separation applications. Additionally, the functionalized block copolymers may be used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported by Vinodh et al., J. Biosci. Tech., 1(1), 45-51 (2009), who disclose that quaternized S-EB-S block copolymers have antimicrobial activity. In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the functionalized block copolymers described herein are particularly employed as materials for water vapor transporting membranes which are employed in wet or aqueous environments. Such membranes are, for example useful in fuel cells, filtration devices, devices for controlling humidity, devices for forward electro-dialysis, devices for reverse electro-dialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries.

Figure 4:
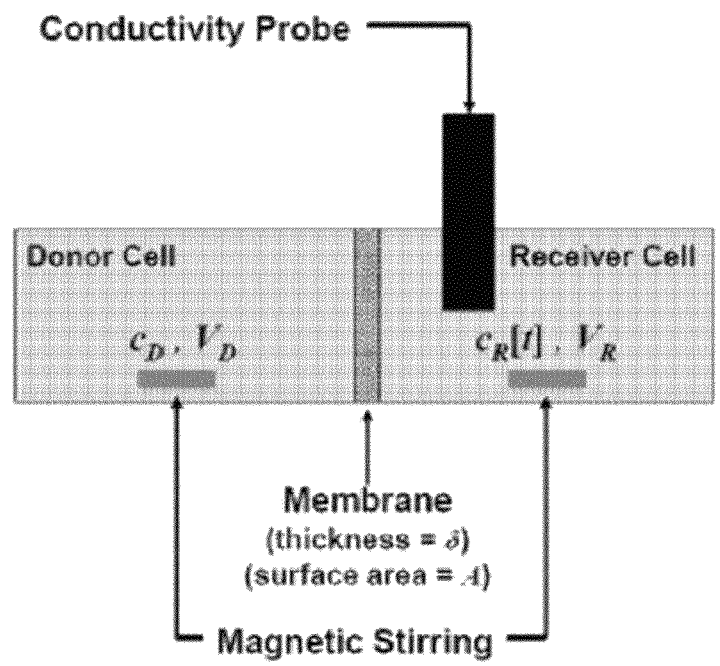
FIG. 4 schematically illustrates the experiment set-up for measuring the permeability.

In some embodiments, the functionalized block copolymers are particularly advantageously employed in a membrane for an electro-deionization assembly which comprises at least one anode, at least one cathode, and one or more membranes. Electro-deionization assemblies include, in particular, desalination cells. An illustrative representation of a desalination cell is set forth in FIG. 4.

To be useful in an electrically driven desalination application, a membrane which transports cations is needed to transport ions that are attracted to the negatively charged electrode. This membrane must reject anions (cationic membrane). Each cell also needs a membrane which transports anions in the direction of the positively charged electrode (anionic membrane). It is important that the anionic membrane does not transport cations; a high level of selectivity for anions is important for the efficient use of electricity in these devices. In addition to being well matched to the cationic membrane in electrical properties, the anionic membrane also must be similar to the cationic membrane in mechanical properties, as well.

In some embodiments, the membranes comprising the functionalized block copolymer are particularly suited as anionic membranes. In particular applications the anionic membranes comprising the functionalized block copolymer may advantageously be paired with at least one cationic membrane.

Particular cationic membranes which are suited to be paired with the anionic membranes comprising the functionalized block copolymer are cation-exchange membranes which comprises a sulfonated block copolymer comprising at least two polymer end blocks E and at least one polymer interior block F, wherein each E block contains essentially no sulfonic acid or sulfonated ester functional groups and each F block comprises sulfonation susceptible polymer units and, based on the number of the sulfonation susceptible polymer units, from about 10 to about 100 mol % of sulfonic acid or sulfonate ester functional groups. Such cation-exchange membranes preferably comprise a sulfonated block copolymer as in general and in particular described in U.S. Pat. No. 7,737,224.

The following examples are intended to be illustrative only, and are not intended to be, nor should they be construed as, limiting the scope of the present invention in any way.

6. Examples

Functionalized Block Copolymers with p-VBP and p-VB-Pyr

With respect to examples 1-10 of table 1, anionic polymerization was carried out in cyclohexane as solvent at temperatures from 25-70° C., with examples involving p-VBP polymerized at 25° C. (i.e. room temperature), and using a lithium based initiator. The functionalized block copolymer was polymerized from p-VBP or p-VBPyr for the D block, isoprene (IPM) for the B block, and styrene (S) for the A block. The functionalized block copolymers were prepared having a pentablock configuration after coupling (i.e. $(A-B-D)_nX$) as illustrated in examples 1-10 of table 1.

In each of the examples 1-10, the initial three blocks were polymerized followed a coupling reaction by the addition of a coupling agent DVB, at a ratio of 3:1 DVB to Li. The IPM block in each case has a 3,4-addition content (vinyl content) of 8%. In table 1, all molecular weights are provided as apparent molecular weights. With respect to the measurement of molecular weight, it is believed the high basicity p-VBPyr segments lead to high interaction with the GPC column and consequently has the effect of reducing the apparent molecular weight as compared to the expected real values. The VBP has a similar but much smaller effect.

Each of the block copolymers in examples 1-10 subsequent polymerization were successfully quaternized by stoichiometric reaction with benzylbromide at 70-80° C. in cyclohexane/toluene 1:1. The solids content in the quaternization reaction was approximately 7-8% of the total.

Moreover, several coupling agents were tested with respect to p-VBP containing block copolymers, including methyltrimethoxysilane (MTMS) and glycidoxypropyltrimethylenesilane (GPTS), however coupling was not effective, illustrated by examples 11-12. However, surprisingly, as shown in examples 1-2, when DVB is applied as a coupling agent, coupling occurs and coupling efficiency is about 70-80%, with branching of n=2-3. In examples 1-2, to promote DVB coupling, the VBP endblocks were capped with a small amount of isoprene.

TABLE 1

| Ex. | Configuration | Target Mol. Wt. (k) | | | NMR Wt. % | | | Final Product GPC (k) | | | Vinyl content (%) (-3,4 addition) | Coupling Efficiency | agent |
|---|---|---|---|---|---|---|---|---|---|---|---|---|---|
| | | p-VBP | IPM | TBS/Sty | p-VBP | IPM | TBS/Sty | Mw | Mn | Mw/Mn | | | |
| 1 | TBS-IPM-VBP | 12.5 | 10 | 15 | 30 | 28 | 42 | 21.2 | 11.9 | 1.8 | 6.5 | n/a | |
| 2 | VBP-IPM-TBS | 10 | 8 | 15 | 33 | 27 | 41 | 32.3 | 22.9 | 1.4 | 19 | n/a | |
| 3 | VBP-IPM-TBS | 10 | 8 | 15 | 30 | 30 | 40 | 35.9 | 25.3 | 1.4 | 19 | n/a | |
| 4 | VBP | 15 | | | 100 | | | 6.27 | 5.7 | 1.13 | — | n/a | |
| 5 | VBP-IPM-TBS | 10 | 5 | 12.5 | 38 | 13 | 49 | 23.3 | 20.6 | 1.13 | 37 | n/a | |
| 6 | VBP-IPM-TBS | 10 | 10 | 12.5 | 29 | 28 | 43 | 30.9 | 26.6 | 1.16 | 30 | n/a | |
| 7 | TBS-IPM-VBP | 25 | 10 | 15 | 50 | 22.5 | 27.5 | 30.9 | 23 | 1.34 | 6.5 | n/a | |
| 8 | S-IPM-VBP | 15 | 10 | 15 | 43 | 24 | 33 | 37.8 | 30.6 | 1.23 | 6.5 | n/a | |
| 9 | S-IPM-VBP | 22 | 10 | 15 | 36 | 2.45 | 39.5 | 42.6 | 27.5 | 1.55 | 7 | 70-80% | DVB |
| 10 | S-IPM-VBP | 15 | 10 | 15 | 35 | 23 | 42 | 38.1 | 26.1 | 1.46 | 8.6 | 70-80% | DVB |
| 11 | S-IPM-VBP | 15 | 10 | 15 | 35 | 23 | 42 | 38.1 | 26.1 | 1.46 | 8.6 | 70-80% | DVB |
| 12 | S-IPM-VBP | | | | | | | | | | | No coupling | MTMS |
| 13 | S-IPM-VBP | | | | | | | | | | | No coupling | GPTS |

Functionalized Block Copolymers with p-VBM

In further example 13, shown in Table 2, polymerizations including the monomer p-VBM was conducted to produce a pentablock A-B-D-B-A with p-VBM as the D block, IPM as the B block, and S as the A block.

TABLE 2

| Example | Configuration | Weight % | | | Solvent | Coupling | | GPC data (k apparent) | | | | | |
| | | Step I | Step II | Step III | | vinyl | agent | S2 Mw | S2 Mn | S2 Dist | S3 Mw | S3 Mn | S3 Dist |
|---|---|---|---|---|---|---|---|---|---|---|---|---|---|
| 13 | S-IPM-VBM-IPM-S | 33 | 22 | 45 | CH | 6.6 | self | 29.5 | 28.4 | 1.04 | 58.5 | 47 | 1.24 |

Notably, example 13 underwent a coupling reaction without the addition of a coupling agent. Accordingly, example 13 resulted in a self coupled pentablock structure with p-VBM as the midblock, with branching of n=2-3.

The inclusion of the soft IPM block and hard S block, along with the functionalized D block, provide block copolymers with a good balance of properties, including mechanical strength without being too brittle. Accordingly, with quaternization of the D block, such pentablock structures are beneficial and stable for use in a wide variety of applications, including AEM applications.

Example 8: Hypothetical Example

A membrane of the present invention is prepared from a polymer synthesized by anionic polymerization of a functional monomer.

Using anionic polymerization grade solvents, monomers and lithium alkyl initiators and using standard anionic polymerization techniques, 8 liters of cyclohexane is heated to 50° C. in a 10 liter, water cooled reactor is treated with 10 meq. of sec-butyl v (s-BuLi; 1 M solution in cyclohexane). About 150 g of styrene monomer, S, is added to afford a first polymer block of about 15,000 g/mol molecular weight (MW). Initiation of polymerization will be noted by a change in color of the solution to red-orange and a modest increase in the temperature of the polymerization solution. After completion of polymerization of the styrene monomer, about 100 g of isoprene, Ip, is added to afford a living two block copolymer having a total MW of about 25,000 g/mol. Polymerization of the isoprene will change the color of the solution to a slight yellow. When isoprene polymerization is complete, about 150 of the piperidylmethyl functionalized styrene monomer (pPMS; prepared by reacting p-chloromethylstyrene with piperidene) is added to afford a total three block copolymer of about 40,000 g/mol MW. The addition of the functionalized monomer will induce a change in the color of the living polymerization solution to a distinctly red color. When polymerization of the third block of the copolymer is complete, a coupling agent, 0.4 meq of tetramethoxysilane, is added to the polymerization solution and reaction is allowed to proceed at 50° C. for about 4 hours. Analysis of the polymer product by gel permeation chromatography will show that at least 80% of the polymer chains will have been coupled to afford a mixture of a linear, 5 block copolymer, $(S-Ip-pPMS)_2—Si(OMe)_2$, and related branched polymers, $(S-Ip-pPMS)_3—SiOMe$ and $(S-Ip-pPMS)_4—Si$. The incorporation of the functional monomer will be quantitatively assayed using a $^1H$-NMR technique.

The product solution will be cast onto a siliconized mylar surface. Evaporation of the volatile components of the solution will afford a thin, about 1 mil thick, uniform membrane. The membrane will be microphase separated having a phase containing the functional monomer component of the block copolymer and a separate phase containing the styrene and isoprene components of the block copolymer.

The membrane will be soaked overnight in an alcoholic solution of neo-pentyl bromide. The product membrane will contain a continuous quaternary ammonium ion containing phase formed by the reaction of the neo-pentyl bromide reagent with the tertiary amine substituents in the pPMS monomer portion of the block copolymer. This phase of the membrane will effectively transport water and negatively charged ions, like chloride. It will selectively reject the transport of positively charged ions, like Na+. Thus, this phase will afford the membrane anionic exchange membrane performance.

The co-continuous ion free phase of the membrane will afford strength properties for the membrane. The membrane is expected to have over 1,000 psi tensile strength, when test wet or dry. In this way, a strong, effective anionic exchange membrane can be prepared by anionic polymerization of a functional monomer.

What is claimed is:

1. A process for preparing an amino-functionalized block copolymer comprising:
   in an inert hydrocarbon solvent and in the presence of an initiator,
   (a) polymerizing a hard end block A, the block A having a melting temperature of at least about 20° C.;
   (b) polymerizing a soft interior block B, the B block having a $T_g$ of at most 20° C.;
   (c) polymerizing a block D from a plurality of p-vinylbenzylamino derivative monomers, the p-vinylbenzylamino derivative monomers capable of being polymerized at a temperature range of from 20° C. to 60° C.;
   thereby forming a block polymer or a living block polymer comprising the blocks A, B and D.

2. The process of claim 1 comprising:
   further polymerizing one or more additional blocks A, B or D to form a block polymer having the configuration A-B-D-B-A or A-D-B-D-A, or
   coupling the block polymer formed by steps (a) through (c) with a coupling agent to form a block polymer having the configuration $(A-B-D)_nX$ or $(A-D-B)_nX$ wherein X is the residue of the coupling agent and n is an integer from 2-30.

3. The process of claim 2, wherein the block copolymer is coupled, and the coupling agent is a divinylaromatic compound.

4. The process of claim 3, wherein the coupling agent is divinylbenzene and n is an integer from 2-3.

5. The process of claim 2, wherein each block A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, (v) conjugated diene monomers which are subsequently hydrogenation, and (vi) mixtures of monomers selected from (i) to (v), and wherein each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

6. The process of claim 5 wherein the A block is formed from substituted or unsubstituted styrene and alpha-alkyl styrene monomers, and the B block is formed from conjugated diene.

7. The process of claim 1, wherein the amino functionality in the block D is a tertiary amine.

8. The process of claim 1, wherein the p-vinylbenzylamino derivative monomers are selected from the group consisting of p-vinylbenzylpiperidine, p-vinylbenzylmorphiline, p-vinylbenzyldimethylamine, p-vinylbenzylpyrrolidine, p-vinylbenzyl-bis-(2-methoxyethyl)amine, p- and vinylbenzylpiperazine, and mixtures thereof.

9. The process of claim 1, wherein the amine functionality in the polymerized block D is a quaternary amine.

10. The process of claim 9, wherein the quaternary amine has a halide counter ion.

11. The process of claim 1, wherein the block polymer is provided in an anionic exchange membrane.

12. The process of claim 1, wherein the amine is a saturated or unsaturated cyclic, or aromatic amine.

13. The process of claim 1, wherein prior to step (c), the p-vinylbenzylamine monomers are formed by reacting a p-vinylbenzylhalide with an amine.

14. The process of claim 1 wherein block D comprises on average at least one amino functionalized polymer unit of formula (I)

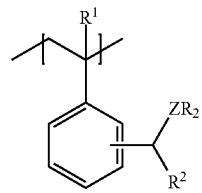

wherein
Z is nitrogen;
$R^1$ is hydrogen or alkyl;
$R^2$ is hydrogen;
R each independently, is hydrogen or is alkyl optionally substituted by a moiety -$(A^1$-$NR^a)_xR^b$ or -$(A^1$-$OR^a)_xR^b$; or
two R groups, together with the Z to which they are bonded, form a ring optionally substituted with hetero members selected from nitrogen or oxygen;
x is 1, 2 or 3;
$A^1$ is straight chain alkylene optionally substituted by one or more methyl and/or ethyl groups; and
$R^a$ and $R^b$, each independently, is hydrogen or alkyl;
or a corresponding onium salt.

15. The process of claim 14 wherein the Z and the two R moieties form a ring selected from the group consisting of pyrrolidine, piperidine, piperazine, 1-azabicyclo[2,2,2]nonane, 1,4-diazabicyclo[2,2,2]octane (DABCO), morpholine, pyrrole, pyrazole, imidazole, pyridine, pyridazine, pyrimidine, pyrazine, indole, isoindole, indazole, purine, carbazole, phenoxazine, and azepine.

16. The process of claim 14 wherein when rings formed by the Z and the two R moieties have multiple nitrogen functionalities the Z and each nitrogen functionality is quaternized.

17. The process of claim 14 wherein the Z and the two R moieties form an alkoxy amine.

18. The process of claim 14, wherein the Z and the two R moieties form morpholine, and the block copolymer is self-coupled and contains no coupling agent residue.

* * * * *